US012700129B2

(12) United States Patent
Geng et al.

(10) Patent No.: US 12,700,129 B2
(45) Date of Patent: Aug. 4, 2026

(54) FEATURE DETECTION AND LOCALIZATION

(71) Applicant: NVIDIA Corporation, Santa Clara, CA (US)

(72) Inventors: Jiaxing Geng, Beijing (CN); Yu Zhang, Sunnyvale, CA (US); Derek Miller, Santa Clara, CA (US); Lin Yang, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 201 days.

(21) Appl. No.: 18/225,267

(22) Filed: Jul. 24, 2023

(65) Prior Publication Data

US 2025/0037302 A1     Jan. 30, 2025

(51) Int. Cl.
| | |
|---|---|
| *G06K 9/00* | (2022.01) |
| *G06T 7/60* | (2017.01) |
| *G06T 7/73* | (2017.01) |

(52) U.S. Cl.
CPC .................. *G06T 7/73* (2017.01); *G06T 7/60* (2013.01); *G06T 2200/04* (2013.01); *G06T 2207/10028* (2013.01); *G06T 2207/30252* (2013.01)

(58) Field of Classification Search
CPC ......... G06T 7/73; G06T 7/60; G06T 2200/04; G06T 2207/10028; G06T 2207/30252
See application file for complete search history.

(56) References Cited

U.S. PATENT DOCUMENTS

| | | | |
|---|---|---|---|
| 6,891,960 B2* | 5/2005 | Retterath | ......... G08G 1/096758 |
| | | | 382/104 |
| 8,131,018 B2* | 3/2012 | Wilson | ................. G06V 20/582 |
| | | | 382/104 |

(Continued)

FOREIGN PATENT DOCUMENTS

| | | | | |
|---|---|---|---|---|
| CN | 115100264 A | 9/2022 | | |
| WO | WO-2007102065 A1* | 9/2007 | ........... | G06V 20/584 |
| WO | WO-2018126228 A1* | 7/2018 | ............. | G06V 10/34 |

OTHER PUBLICATIONS

Deep-Learning and Depth-Map Based Approach for Detection and 3-D Localization of Small Traffic Signs, Lirong Liu et al., IEEE, 2020, pp. 2096-2111 (Year: 2020).*

(Continued)

*Primary Examiner* — Jayesh A Patel
(74) *Attorney, Agent, or Firm* — IRON SUMMIT IP LLP

(57) ABSTRACT

In various examples, three-dimensional (3D) object or feature detection and localization for autonomous and semi-autonomous systems and applications is described herein. Systems and methods are disclosed that use different types of sensors, such as an image sensor and a LIDAR sensor, to determine information associated with objects, such as traffic objects (e.g., traffic signs, traffic signals, traffic markings, etc.). To determine the information for an object, image data is processed to determine a bounding shape associated with the object. The bounding shape is then used to determine a 3D shape, such as a frustum, corresponding to the object. Additionally, points data generated using the LIDAR sensor, such as an occupancy map and/or a point cloud, is processed to identify a portion of the points associated with (e.g., located within) the 3D shape. This portion of the points may then be used to determine the information associated with the object.

20 Claims, 19 Drawing Sheets

1000

DETERMINE, BASED AT LEAST ON SENSOR DATA, A FIRST GEOMETRY ASSOCIATED WITH A FIRST THREE-DIMENSIONAL (3D) LOCATION OF AN OBJECT
B1002

DETERMINE, BASED AT LEAST ON ONE OR MORE CHARACTERISTICS ASSOCIATED WITH THE OBJECT, A SECOND GEOMETRY ASSOCIATED WITH THE OBJECT
B1004

DETERMINE, BASED AT LEAST ON THE FIRST GEOMETRY AND THE SECOND GEOMETRY, A THIRD GEOMETRY ASSOCIATED WITH A SECOND 3D LOCATION OF THE OBJECT
B1006

(56) References Cited

U.S. PATENT DOCUMENTS

| | | | | |
|---|---|---|---|---|
| 10,169,680 B1 * | 1/2019 | Sachdeva | ........... | G06V 10/7788 |
| 10,684,626 B1 * | 6/2020 | Martin | ................. | G08G 1/0962 |
| 10,816,993 B1 * | 10/2020 | Tran | ........................ | G06N 3/045 |
| 10,824,862 B2 * | 11/2020 | Qi | ........................ | G06F 18/2414 |
| 10,859,395 B2 * | 12/2020 | Wheeler | ............ | G01C 21/3638 |
| 11,074,717 B2 | 7/2021 | Tremblay et al. | | |
| 11,195,331 B2 | 12/2021 | Lee et al. | | |
| 11,210,537 B2 | 12/2021 | Koivisto et al. | | |
| 11,887,475 B1 * | 1/2024 | Riggs | ................. | G08G 1/09623 |
| 2005/0275718 A1 * | 12/2005 | Lun Lai | .................... | G06T 7/73 |
| | | | | 348/113 |
| 2011/0109618 A1 * | 5/2011 | Nowak | .............. | G01C 21/3647 |
| | | | | 345/419 |
| 2012/0288138 A1 * | 11/2012 | Zeng | .................. | G08G 1/09623 |
| | | | | 382/103 |
| 2013/0253754 A1 * | 9/2013 | Ferguson | ........ | B60W 30/18154 |
| | | | | 701/28 |
| 2015/0179088 A1 * | 6/2015 | Raman | .............. | H04M 1/72457 |
| | | | | 340/944 |
| 2016/0156856 A1 * | 6/2016 | Lee | ......................... | A61B 5/015 |
| | | | | 348/164 |
| 2018/0121763 A1 * | 5/2018 | Surnilla | ................ | G06V 10/809 |
| 2018/0188027 A1 * | 7/2018 | Zhang | ........................ | G06T 7/11 |
| 2018/0188059 A1 * | 7/2018 | Wheeler | ............ | G01C 21/3638 |
| 2018/0189578 A1 * | 7/2018 | Yang | .................. | G01C 21/3638 |
| 2018/0307925 A1 * | 10/2018 | Wisniowski | .............. | G06T 7/73 |
| 2018/0348346 A1 * | 12/2018 | Vallespi-Gonzalez | ....................... | |
| | | | | G01S 7/4802 |
| 2019/0147245 A1 * | 5/2019 | Qi | .......................... | G06V 10/82 |
| | | | | 382/103 |
| 2019/0311619 A1 * | 10/2019 | Tao | ....................... | G08G 1/0145 |
| 2020/0027229 A1 * | 1/2020 | Shen | .................... | G06V 10/776 |
| 2021/0063578 A1 | 3/2021 | Wekel et al. | | |
| 2021/0342609 A1 | 11/2021 | Smolyanskiy et al. | | |
| 2022/0214187 A1 * | 7/2022 | Liu | ......................... | G06T 19/00 |
| 2022/0261593 A1 | 8/2022 | Yu et al. | | |
| 2023/0016568 A1 | 1/2023 | Sriram et al. | | |
| 2023/0075493 A1 * | 3/2023 | Kabkab | ................ | G06V 20/582 |
| 2023/0147434 A1 * | 5/2023 | Mitchell | ............... | G01S 17/894 |
| | | | | 356/4.01 |
| 2023/0169780 A1 * | 6/2023 | Sharma | ................ | G06V 20/584 |
| 2023/0343108 A1 * | 10/2023 | Hemantharaja | ........ | G06V 10/82 |
| 2024/0096111 A1 | 3/2024 | Agarwal et al. | | |
| 2025/0037301 A1 | 1/2025 | Geng et al. | | |
| 2025/0037302 A1 | 1/2025 | Geng et al. | | |

OTHER PUBLICATIONS

Object Detection Using LiDAR and Camera Fusion in Off-road Conditions, Mahir Gulzar, Thesis, 2019, pp. 1-45 (Year: 2019).*

3D object detection algorithm based on multi-sensor segmental fusion of frustum association for autonomous driving, Chongben Tao et al., Springer, Jul. 2, 2023, pp. 22753-22773 (Year: 2023).*

Camera-Radar Sensor Fusion using Deep Learning, Johannes Kübel et al., 2022, pp. 1-97. (Year: 2022).*

Geng, Jiaxing; Final Office Action for U.S. Appl. No. 18/225,262, filed Jul. 24, 2023, mailed Dec. 12, 2025, 17 pgs.

Geng, Jiaxing; Non-Final Office Action for U.S. Appl. No. 18/225,262, filed Jul. 24, 2023, mailed Sep. 17, 2025, 28 pgs.

Gulzar; "Object Detection Using LiDAR and Camera Fusion of Off-road Conditions," University of Tarfu, Institute of Computer Science Computer Science Curriculum; 2019, 51 pgs.

Kubel, et al.; "Camera-Radar Sensor Fusion using Deep Learning," University of Stuttgart, Chalmers University of Technology, 2022, 120 pgs.

Liu, et al.; "Deep-Learning and Depth-Map Based Approach for Detection and 3-D Localization of Small Traffic Signs," IEEE Journal of Selected Topics in Applied Earth Observations and Remote Sensing, vol. 13, 2020, 16 pgs.

Tao, et al.; "3D object detection algorithm based on multi-sensor segmental fusion of frustum association for autonomous driving," Applied Intelligence 2023, https://doi.org/10.1007/s10489-023-043630-4, 2023, 22 pgs.

Geng, Jiaxing; Non-Final Office Action for U.S. Appl. No. 18/225,262, filed Jul. 24, 2023, mailed Mar. 25, 2026, 19 pgs.

* cited by examiner

IMAGE 214

VERTEX 220(2)

BOUNDING SHAPE 216(2)

VERTEX 220(1)

VERTEX 220(3)

VERTEX 220(4)

TRAFFIC SIGNAL 210(2)

BOUNDING SHAPE 216(1)

VERTEX 218(2)

VERTEX 218(3)

VERTEX 218(1)

TRAFFIC SIGN 210(1)

VERTEX 218(4)

ENVIRONMENT
302

POINTS
304

POINTS
504

PLANE
416

PLANE
412

SHAPE
502

PLANE 416

POINTS 508

SHAPE 506

PLANE 412

800

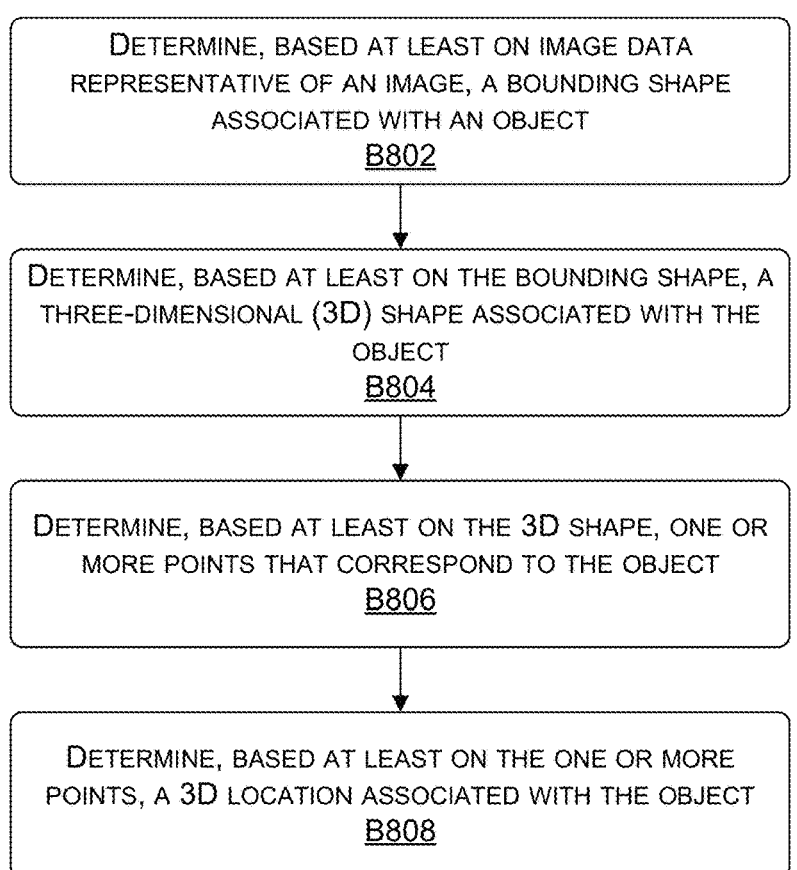

DETERMINE, BASED AT LEAST ON IMAGE DATA
REPRESENTATIVE OF AN IMAGE, A BOUNDING SHAPE
ASSOCIATED WITH AN OBJECT
B802

DETERMINE, BASED AT LEAST ON THE BOUNDING SHAPE, A
THREE-DIMENSIONAL (3D) SHAPE ASSOCIATED WITH THE
OBJECT
B804

DETERMINE, BASED AT LEAST ON THE 3D SHAPE, ONE OR
MORE POINTS THAT CORRESPOND TO THE OBJECT
B806

DETERMINE, BASED AT LEAST ON THE ONE OR MORE
POINTS, A 3D LOCATION ASSOCIATED WITH THE OBJECT
B808

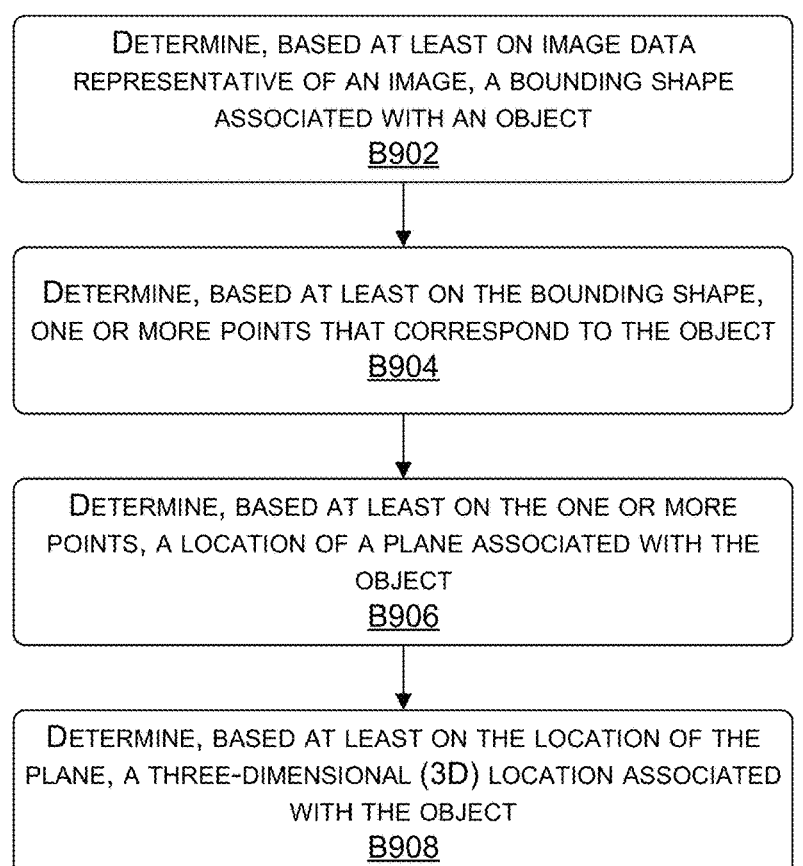

DETERMINE, BASED AT LEAST ON IMAGE DATA
REPRESENTATIVE OF AN IMAGE, A BOUNDING SHAPE
ASSOCIATED WITH AN OBJECT
B902

DETERMINE, BASED AT LEAST ON THE BOUNDING SHAPE,
ONE OR MORE POINTS THAT CORRESPOND TO THE OBJECT
B904

DETERMINE, BASED AT LEAST ON THE ONE OR MORE
POINTS, A LOCATION OF A PLANE ASSOCIATED WITH THE
OBJECT
B906

DETERMINE, BASED AT LEAST ON THE LOCATION OF THE
PLANE, A THREE-DIMENSIONAL (3D) LOCATION ASSOCIATED
WITH THE OBJECT
B908

FIGURE 9

1000

DETERMINE, BASED AT LEAST ON SENSOR DATA, A FIRST
GEOMETRY ASSOCIATED WITH A FIRST THREE-DIMENSIONAL
(3D) LOCATION OF AN OBJECT
B1002

DETERMINE, BASED AT LEAST ON ONE OR MORE
CHARACTERISTICS ASSOCIATED WITH THE OBJECT, A
SECOND GEOMETRY ASSOCIATED WITH THE OBJECT
B1004

DETERMINE, BASED AT LEAST ON THE FIRST GEOMETRY AND
THE SECOND GEOMETRY, A THIRD GEOMETRY ASSOCIATED
WITH A SECOND 3D LOCATION OF THE OBJECT
B1006

FIGURE 10

STEREO CAMERA 1168

MID-RANGE CAMERA, WING MIRROR MOUNT 1198

SURROUND CAMERA 1174

SURROUND CAMERA(S) 1174

MID-RANGE CAMERA, WING MIRROR MOUNT 1198

1100

SURROUND CAMERA(S) 1174

INFRARED CAMERA 1172

WIDE VIEW CAMERA 1170

LONG-RANGE CAMERA 1198

LONG-RANGE CAMERA 1198

STEREO CAMERA 1168

Figure 11D:
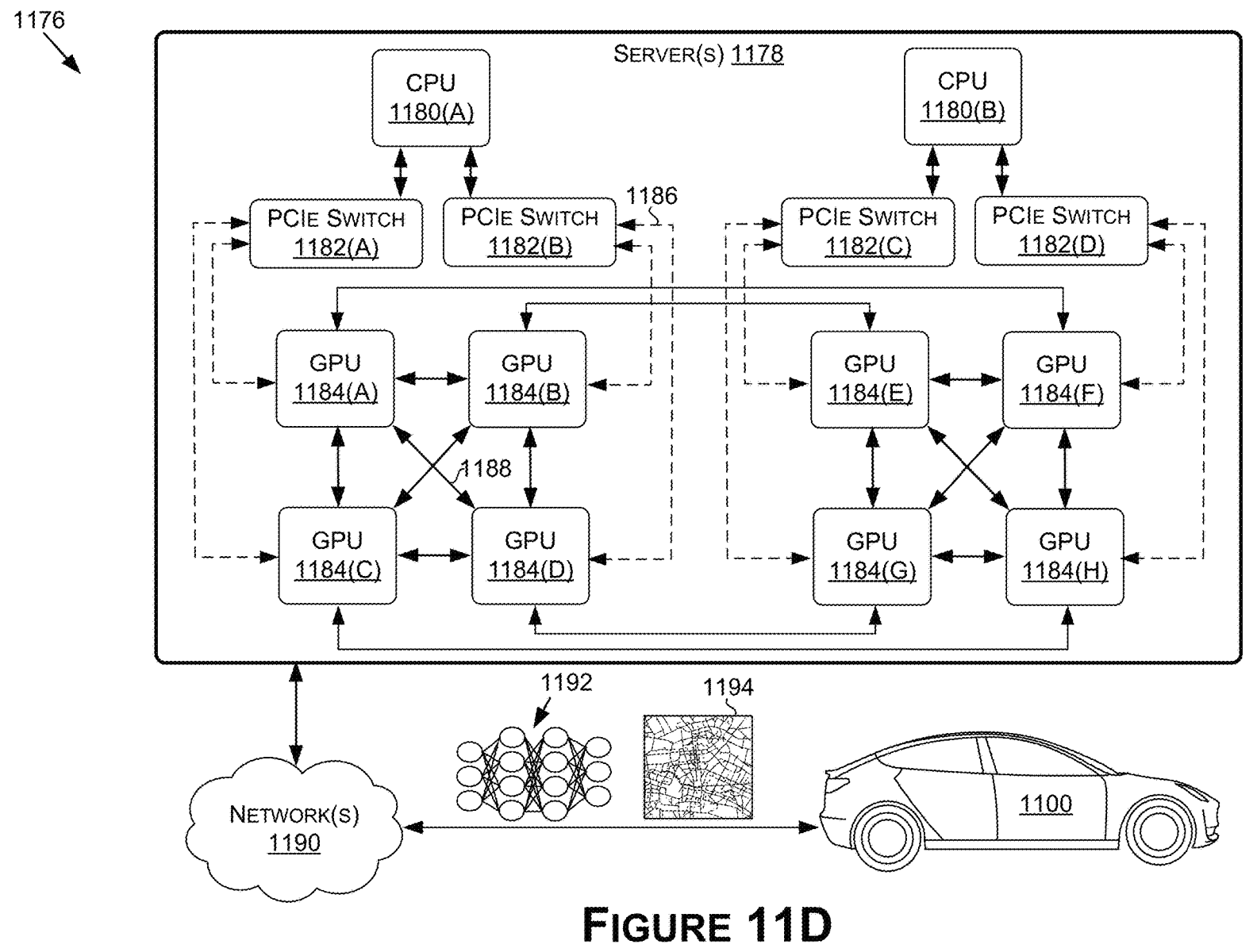

SERVER(S) 1178

CPU 1180(B)

PCIE SWITCH 1182(D)

PCIE SWITCH 1182(C)

GPU 1184(F)

GPU 1184(H)

GPU 1184(E)

GPU 1184(G)

CPU 1180(A)

PCIE SWITCH 1182(B)

PCIE SWITCH 1182(A)

GPU 1184(B)

GPU 1184(D)

GPU 1184(A)

GPU 1184(C)

1186

1188

1194

1192

1100

NETWORK(S) 1190

Figure 12:
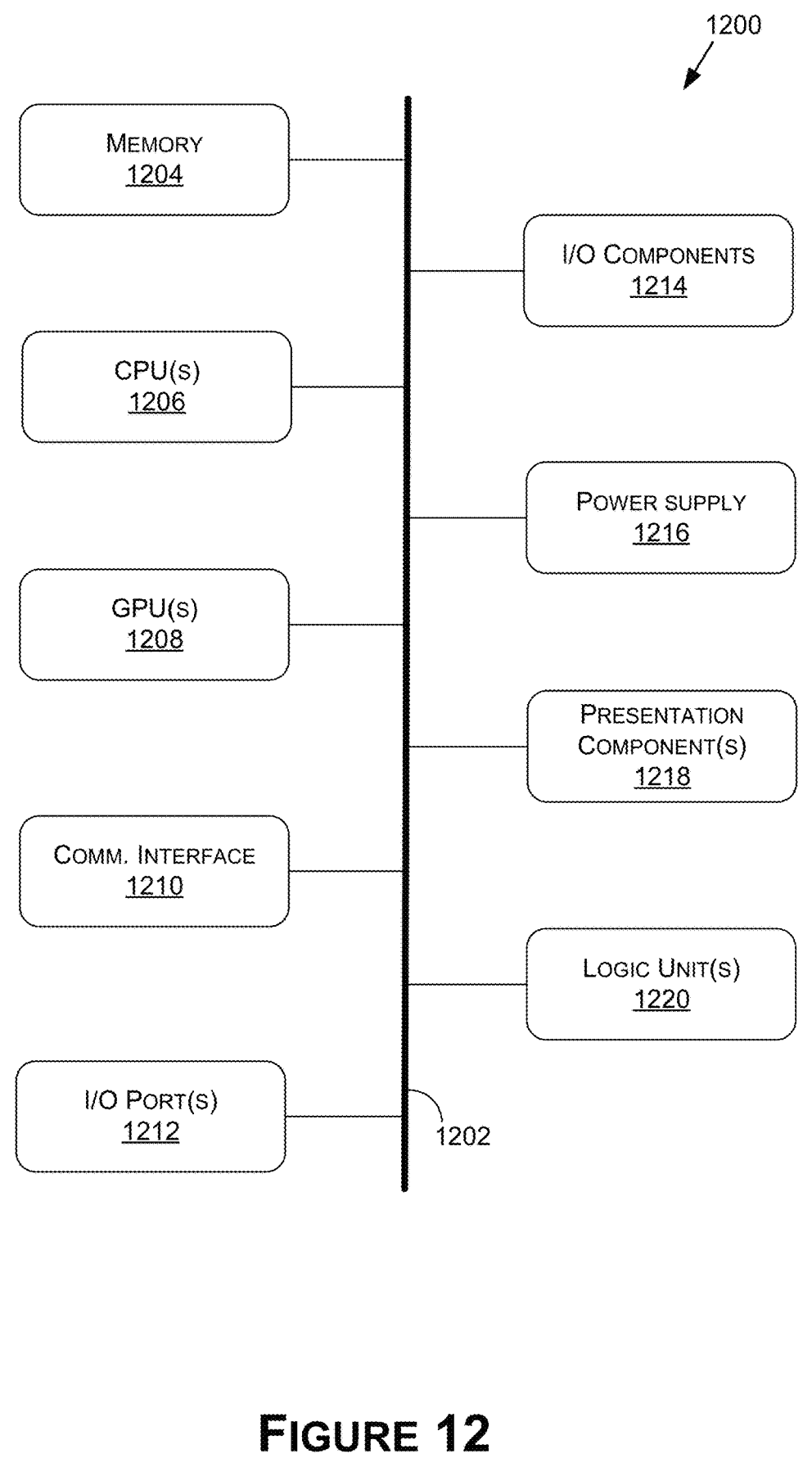

MEMORY
1204

I/O COMPONENTS
1214

CPU(s)
1206

POWER SUPPLY
1216

GPU(s)
1208

PRESENTATION
COMPONENT(S)
1218

COMM. INTERFACE
1210

LOGIC UNIT(S)
1220

I/O PORT(S)
1212

FEATURE DETECTION AND LOCALIZATION

BACKGROUND

Vehicles or machines (e.g., autonomous vehicles or machines, semi-autonomous vehicles or machines, etc.) may use sensors, such as cameras, to perceive environments surrounding the vehicles. For instance, a vehicle may use one or more neural networks to process image data generated using one or more cameras in order to determine information associated with objects surrounding the vehicle. In some circumstances, the information may include locations, orientations, classifications, and/or the like associated with objects. For instance, and for a traffic object, such as a traffic sign or a traffic signal, the information may include the three-dimensional (3D) location of the traffic object within the environment, the orientation of the traffic object within the environment, and a classification (e.g., a speed limit sign) associated with the traffic object.

Conventional systems typically use image data generated using multiple cameras to determine at least a portion of the information, such as the locations and orientations of the objects. While such systems may have a good level of precision for determining such information, in some circumstances, it may be beneficial to increase the precision. For example, since the locations of traffic objects is important for vehicles, increasing the precision of the location determinations and/or the orientation determinations of the traffic objects may also increase the safety of the vehicles since downstream systems will have more precise information when determining how the vehicles should proceed. Additionally, some conventional systems may require that at least two different cameras generate image data representing the same object to determine the information, which may not occur for every object.

SUMMARY

Embodiments of the present disclosure relate to three-dimensional (3D) feature detection and localization for autonomous and semi-autonomous systems and applications. Systems and methods are disclosed that use different types of sensors, such as one or more image sensors (e.g., one or more cameras) and one or more LIDAR sensors, to determine information associated with objects, such as traffic objects (e.g., traffic signs, traffic signals, traffic markings, etc.). To determine the information for an object, image data generated using the image sensor(s) is processed to determine a bounding shape associated with the object. The bounding shape is then used to determine a 3D shape, such as a frustum, corresponding to the object. Additionally, points (or more generally, LIDAR) data generated using the LIDAR sensor(s), such as an occupancy map and/or a point cloud, is then processed to identify a portion of the points associated with (e.g., located within) the 3D shape. This portion of the points may then be used to determine the information associated with the object, such as the location and/or orientation associated with the object.

In contrast to conventional systems, such as those described above, the current systems, in some embodiments, are able to determine more accurate and precise information associated with objects, such as traffic objects (e.g., traffic signs, traffic lights, etc.). For instance, and as described above, conventional systems may only use image sensors to determine the locations and/or orientations of objects. However, while such conventional systems may include a good level of precision, using additional types of sensors, such as LIDAR sensors, may increase the precision since LIDAR sensors are better at determining certain information, such as distances to objects within environments surrounding vehicles. Additionally, in contrast to the conventional systems, the current systems, in some embodiments, are able to determine the information associated with the objects using a single image sensor and/or a single image.

BRIEF DESCRIPTION OF THE DRAWINGS

The present systems and methods for three-dimensional (3D) feature detection and localization for autonomous and semi-autonomous systems and applications are described in detail below with reference to the attached drawing figures, wherein:

FIGS. 8-9 illustrate flow diagrams showing methods for localizing objects within environments, in accordance with some embodiments of the present disclosure;

FIG. 10 illustrates a flow diagram showing a method for updating a geometry associated with a 3D location of an object, in accordance with some embodiments of the present disclosure;

FIG. 11D is a system diagram for communication between cloud-based server(s) and the example autonomous vehicle of FIG. 11A, in accordance with some embodiments of the present disclosure;

FIG. 12 is a block diagram of an example computing device suitable for use in implementing some embodiments of the present disclosure.

DETAILED DESCRIPTION

Figure 1:
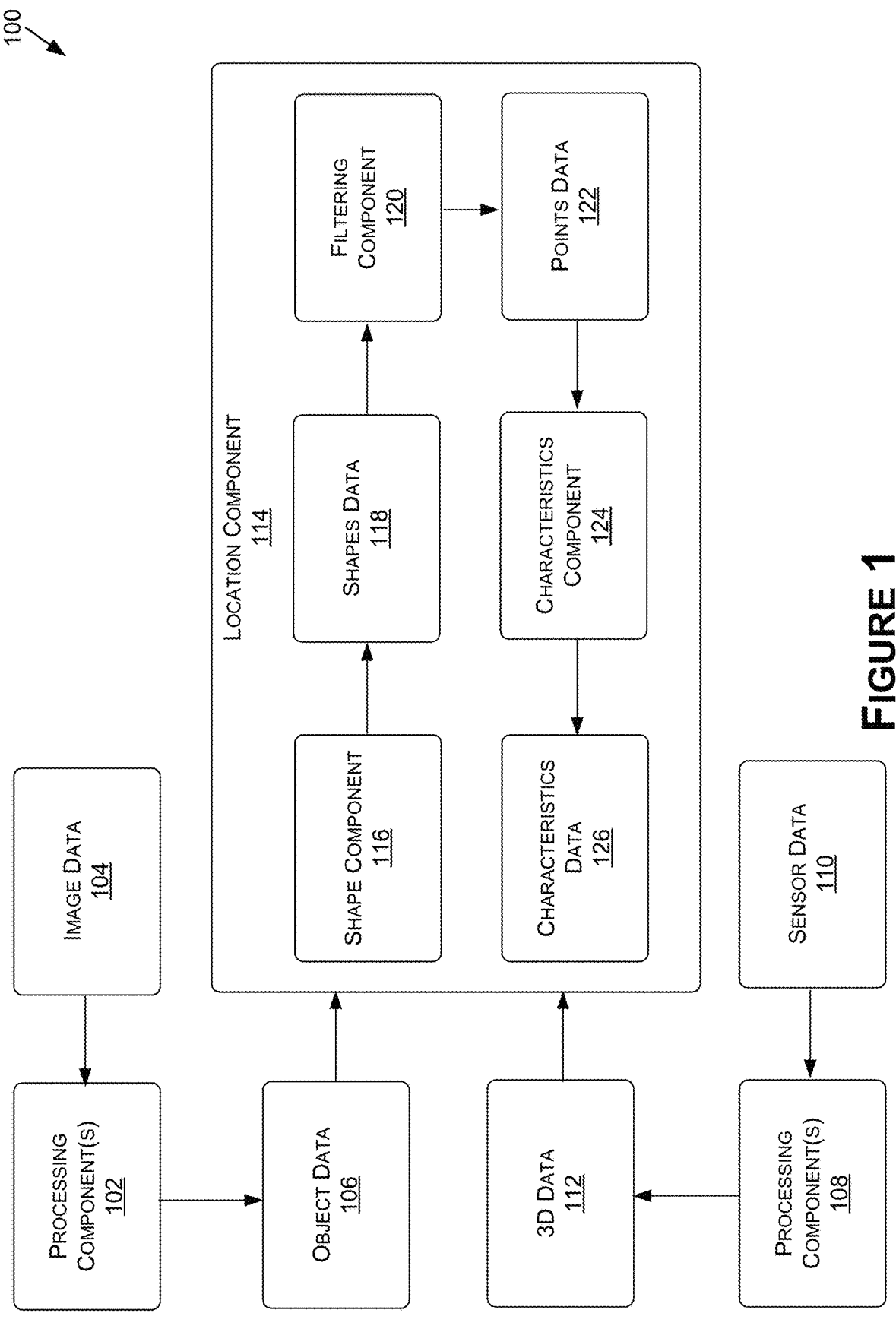
FIG. 1 illustrates an example data flow diagram for a process of performing 3D object localization, in accordance with some embodiments of the present disclosure.

Systems and methods are disclosed related to three-dimensional (3D) feature detection and localization for autonomous systems and applications. Although the present disclosure may be described with respect to an example autonomous or semi-autonomous vehicle or machine 1100 (alternatively referred to herein as "vehicle 1100" or "ego-machine 1100," an example of which is described with respect to FIGS. 11A-11D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to object detection, this is not intended to be limiting, and the systems and methods described herein may be used in augmented reality, virtual reality, mixed reality, robotics, security and surveillance, autonomous or semi-autonomous machine applications, and/or any other technology spaces where object detection may be used.

For instance, a system(s) may receive sensor data generated using one or more sensors of a vehicle (and/or other type of machine). As described herein, the sensor data may include, but is not limited to, image data generated using one or more image sensors (e.g., one or more cameras), LIDAR data generated using one or more LIDAR sensors, radar data generated using one or more radar sensors, and/or any other type of sensor data. The system(s) may then process at least a portion of the sensor data, such as the image data, using one or more techniques in order to determine a two-dimensional (2D) bounding shape associated with an object. For example, the system(s) may process the image data representing an image in order to determine vertices associated with the bounding shape that includes the object, where a vertex may be associated with a location (e.g., a x-coordinate, a y-coordinate, etc.) within the image. As described herein, an object may include, but is not limited to, a traffic object (e.g., a traffic sign, a traffic signal, a traffic marking, etc.), a vehicle, a pedestrian, a structure (e.g., a building, etc.), a road, an animal, and/or any other type of object.

The system(s) may then use the bounding shape to determine a three-dimensional (3D) shape associated with the object within the environment. As described herein, in some examples, the 3D bounding shape may include a frustum. For example, the system(s) may determine first vertices for a first plane using the bounding shape and a minimum distance, where a vertex of the first plane is associated with a location (e.g., a x-coordinate, a y-coordinate, a z-coordinate, a distance, an angle, etc.) within the environment. The system(s) may also determine second vertices for a second plane using the bounding shape and a maximum distance, where a vertex of the second plane is also associated with a location (e.g., a x-coordinate, a y-coordinate, a z-coordinate, a distance, an angle, etc.) within the environment. The system(s) may then determine the frustum using at least the first plane and the second plane, such as by using a 3D area within the environment that is located between the first plane and the second plane.

The system(s) may also use at least a portion of the sensor data, such as the LIDAR data, to generate 3D data associated with the environment. As described herein, the 3D data may represent an occupancy map indicating locations of objects within the environment, a point cloud indicating locations of points within the environment, and/or any other type of 3D information associated with the environment. The system(s) may then use the 3D shape and the 3D data to determine one or more points that are associated with the object. For example, the system(s) may use one or more locations (e.g., one or more coordinates) associated with the point(s) to determine that the point(s) is located within the 3D shape. Additionally, in some examples, the system(s) may use additional techniques to determine the point(s) associated with the object. For example, the system(s) may use one or more attributes associated with the point(s), such as one or more intensity values associated with the point(s), to determine that the point(s) is associated with the object.

The system(s) may then use at least the point(s) to determine information associated with the object, such as a 3D location associated with the object within the environment. In some examples, the 3D location includes a plane that is associated with one or more vertices (e.g., four vertices), where a vertex is associated with a location (e.g., a x-coordinate, a y-coordinate, a z-coordinate, a distance, an angle, etc.) within the environment. Additionally, in some examples, the system(s) may determine the 3D location based on the shape of the object.

For a first example, if the object is a traffic sign that is planar and/or substantially planar, then the system(s) may use the point(s) to determine a plane associated with the object since the point(s) may be associated with substantially similar distance values. The system(s) may then determine the 3D location by projecting the bounding shape (e.g., the vertices associated with the bounding shape) to the determined plane. For a second example, if the object is a traffic signal that includes more of a 3D shape (e.g., the object is not substantially planar), then the system(s) may use a middle of the point(s) to determine a plane that is associated with a center of the object. The system(s) may then again determine the 3D location by projecting the bounding shape (e.g., the vertices associated with the bounding shape) to the determined plane.

In some examples, the system(s) may use additional information associated with the object to determine the 3D location. For example, and again if the object is a traffic signal that includes one or more indicators (e.g., one or more lights), the system(s) may determine a number of the indicator(s) and/or an orientation associated with the indicator(s). The system(s) may then determine a geometry associated with the traffic signal based at least on the number of the indicator(s) and/or the orientation associated with the indicator(s). For example, if the traffic signal includes three indicators that are centered vertically, then the system(s) may use that number of indicators and/or the orientation of the indicators to determine a height to width ratio associated with the traffic signal. The system(s) may then use the geometry to determine the final 3D location associated with the traffic signal. For example, the system(s) may determine the final 3D location such that the plane representing the final 3D location includes a similar geometry as the determined geometry for the traffic signal.

In some examples, the system(s) may use one or more additional techniques to determine additional information associated with the object. For a first example, the system(s) may use a direction of travel associated with the vehicle to determine an orientation associated with the object. For instance, and again if the object is a traffic signal, the system(s) may determine that the traffic sign is orientated in an opposite direction as compared to the direction of travel of the vehicle. For a second example, the system(s) may further process at least a portion of the sensor data (e.g., the image data) to determine a classification associated with the object. For instance, and again if the object is a traffic sign, the system(s) may determine the type of traffic sign using the image data. As described herein, a type of traffic sign may include, but is not limited to, speed limit sign, speed limit 50 MPH sign, speed limit 75 MPH sign, stop sign, yield sign, crosswalk sign, and/or any other type of sign.

The system(s) may then perform similar processes to determine information associated with one or more additional objects. Additionally, the system(s) may perform one or more processes based at least on the information. For a first example, the system(s) may use the information to update locations, orientations, and/or classifications associated with the objects as represented by one or more maps (e.g., the occupancy map). For a second example, such as if the vehicle is currently navigating an environment, the system(s) may use the information when causing the vehicle to perform one or more operations. For instance, one or more downstream systems, such as a planning system, may use the information when determining one or more paths for the vehicle to navigate. While these are just two example processes that may be performed by the system(s) using the information, in other examples, the system(s) may perform additional and/or alternative processes using the information.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems implementing one or more language models—such as one or more large language models (LLMs), systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 illustrates an example data flow diagram for a process of performing 3D object detection and localization, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1100 of FIGS. 11A-11D, example computing device 1200 of FIG. 12, and/or example data center 1300 of FIG. 13.

The process 100 may include one or more first processing components 102 processing image data 104 generated using one or more image sensors of a vehicle. As described herein, the image data 104 may represent one or more images depicting one or more objects. In some examples, an object may include a traffic object, such as a traffic sign (e.g., a speed limit sign, a speed limit 50 MPH sign, a speed limit 75 MPH sign, a stop sign, a crosswalk sign, a yield sign, etc.), a traffic signal (e.g., a traffic light, a railroad signal, a school zone signal, etc.), a road marking (e.g., a road line, etc.), and/or any other type of traffic object. However, in other examples, an object may include any other type of object, such as a vehicle, a pedestrian, a structure, an animal, and/or any other type of object. Additionally, in some examples, an object may include a planar and/or substantially planar object, such as a traffic sign, or an object may include a more 3D shape, such as a traffic signal.

The first processing component(s) 102, which may include one or more perception systems, may include functionality to perform object detection, segmentation, and/or classification. For instance, the first processing component(s) 102 may output object data 106 indicating detected lanes and boundaries on driving surfaces, detected drivable freespace, detect poles or signs, detected objects in the environment (e.g., vehicles, pedestrians, animals, inanimate objects, traffic signs, traffic signals, etc.), detected wait conditions and intersections, and/or the like. In additional or alternative examples, the first processing component(s) 102 may generate object data 106 that indicates one or more characteristics associated with a detected object and/or the environment in which the object is positioned. The characteristics associated with an object may include, but are not limited to, an x-position (global and/or local position), a y-position (global and/or local position), a z-position (global and/or local position), an orientation (e.g., a roll, pitch, yaw), an object classification (e.g., a type of object), a velocity, an acceleration, an extent of the object (size), etc.

In those examples in which the first processing component(s) 102 performs detection, the first processing component(s) 102 may generate output data 106 that indicates detections of objects detected in an image. Such detections may comprise two-dimensional (2D) bounding shapes and/ or masks of detected objects. Additionally, in some examples, the output data 106 may indicate a probability associated with an object, such as a probability associated with a location of the object, a classification of the object, and/or the like. In some examples, the detection of the first processing component(s) 102 may use a machine learning approach (e.g., scale-invariant feature transform (SIFT), histogram of oriented gradients (HOG), etc.) followed by a support vector machine (SVM) to classify objects depicted in images represented by the image data 104. Additionally, or alternatively, detection may use a deep learning approach based on, for example, a convolutional neural network (CNN) to classify objects depicted in images represented by the image data 104.

Figure 2A:
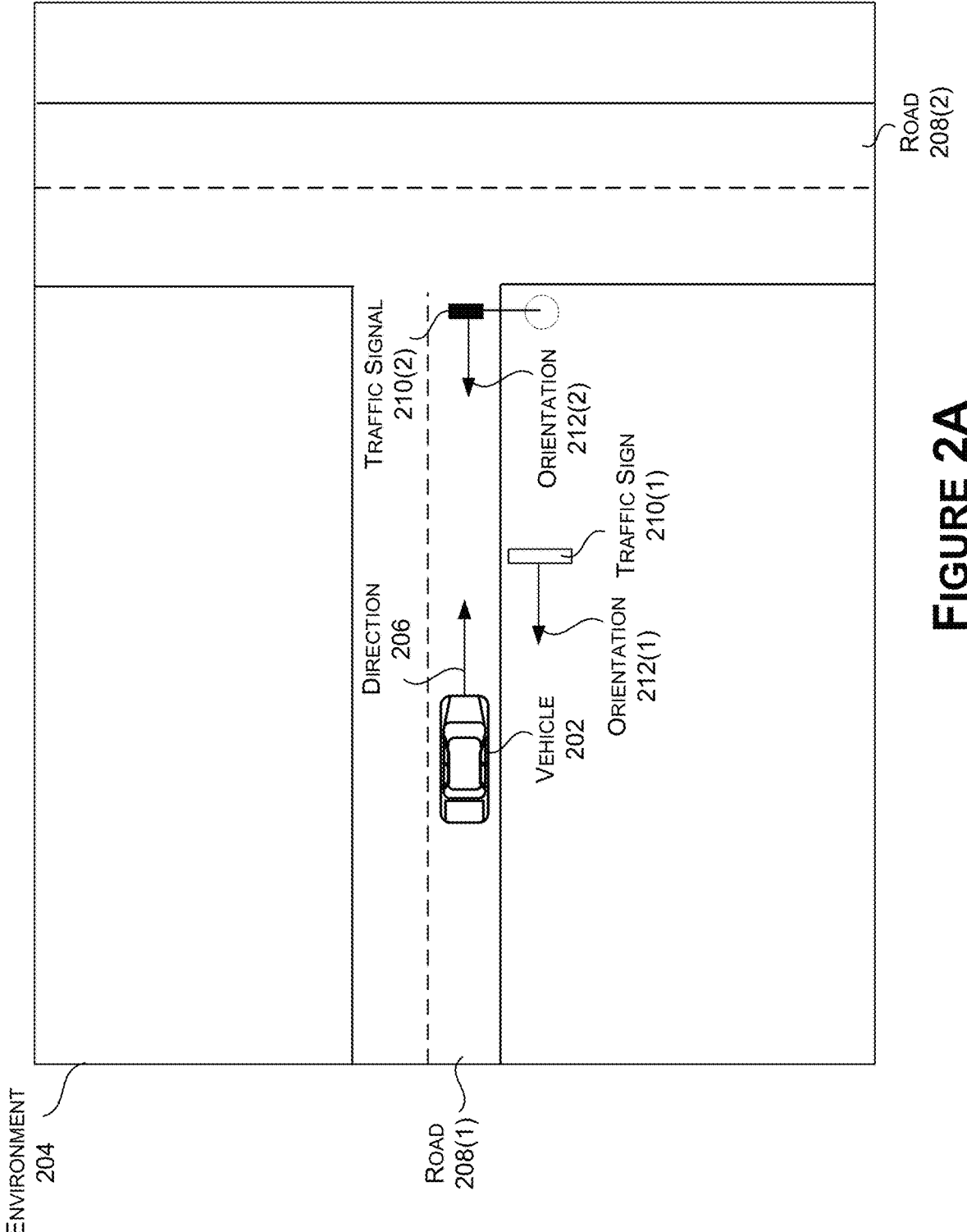
FIGS. 2A-2B illustrate an example of a vehicle detecting objects located within an environment, in accordance with some embodiments of the present disclosure.
Figure 2B:

For instance, FIGS. 2A-2B illustrate an example of a vehicle 202 detecting objects located within an environment 204, in accordance with some embodiments of the present disclosure. As shown by the example of FIG. 2A, the vehicle 202 may be navigating in a direction 206 along a first road 208(1) within the environment 204 and approaching a second road 208(2). While navigating, the vehicle 202 may be approaching at least two objects, such as a traffic sign 210(1) and a traffic signal 210(2). The example of FIG. 2A further illustrates that a first orientation 212(1) associated with the traffic sign 210(1) and a second orientation 212(2) associated with the traffic signal 210(2) is substantially towards the vehicle 202. For instance, the traffic sign 210(1) may be oriented within the environment 204 such that the content (e.g., the text, the graphics, etc.) of the traffic sign 210(1) is oriented towards the vehicle 202. Additionally, the traffic signal 210(2) may be oriented within the environment 204 such that the indicators (e.g., the lights) of the traffic signal 210(2) are oriented towards the vehicle 202.

As shown by the example of FIG. 2B, while navigating around the environment 204, the vehicle 202 may generate image data (e.g., the image data 104) using one or more image sensors, where the image data represents at least an image 214 depicting the traffic sign 210(1) and the traffic signal 210(2). The first processing component(s) 102 may then process the image data and, based at least on the processing, determine a first bounding shape 216(1) (e.g., a first bounding box) associated with the traffic sign 210(1) and a second bounding shape 216(2) (e.g., a second bounding box) associated with the traffic signal 210(2). The first bounding shape 216(1) includes vertices 218(1)-(4) (also referred to singularly as "vertex 218" or in plural as "vertices 218") and the second bounding shape 216(2) includes vertices 220(1)-(4) (also referred to singularly as "vertex 220" or in plural as "vertices 222"). In some examples, the vertices 218 and/or the vertices 220 may be associated with locations, such as coordinates (e.g., x-coordinates and y-coordinates) within the image 214.

Referring back to the example of FIG. 1, the process 100 may include one or more second processing components 108 processing sensor data 110 generated using one or more sensors of the vehicle. As described herein, the sensor data 110 may include, but is not limited to, LIDAR data generated using one or more LIDAR sensors, radar data generated using one or more radar sensors, and/or any other type of sensor data generated using any other type of distance sensor. Based at least on the processing, the second processing component(s) 108 may generate 3D data 112 associated with the environment. As described herein, in some examples, the 3D data 112 may represent an occupancy map indicating one or more areas of the environment that are occupied by one or more objects and/or one or more areas of the environment that are unoccupied. Additionally, or alternatively, in some examples, the 3D data 112 may represent a point cloud that indicates the locations of points associated with the environment.

In any of the examples, the 3D data 112 may represent attributes associated with the points. As described herein, attributes associated with a point may include, but are not limited to, a location (e.g., an x-coordinate, a y-coordinate, and a z-coordinate) associated with the point, a distance to the point, an angle to the point, an intensity value associated with the point, and/or any other attribute. For the intensity values, the LIDAR sensor(s) used to generate the sensor data 110 may measure the intensity values of the points at the time the light returns back to the LiDAR sensor(s). In some examples, the intensity values may be represented using a number, such as a number between 0 and 256 (although other ranges may be used in other examples), where the number various based on the composition (e.g., color, texture, material, etc.) of the surface for which the light reflected. For example, a low number may indicate a low reflectivity while a high number indicates a high reflectivity. In some examples, the intensity may depend on other factors, such as the angles of arrival, the ranges of the points, moisture content, and/or the like.

Figure 3:
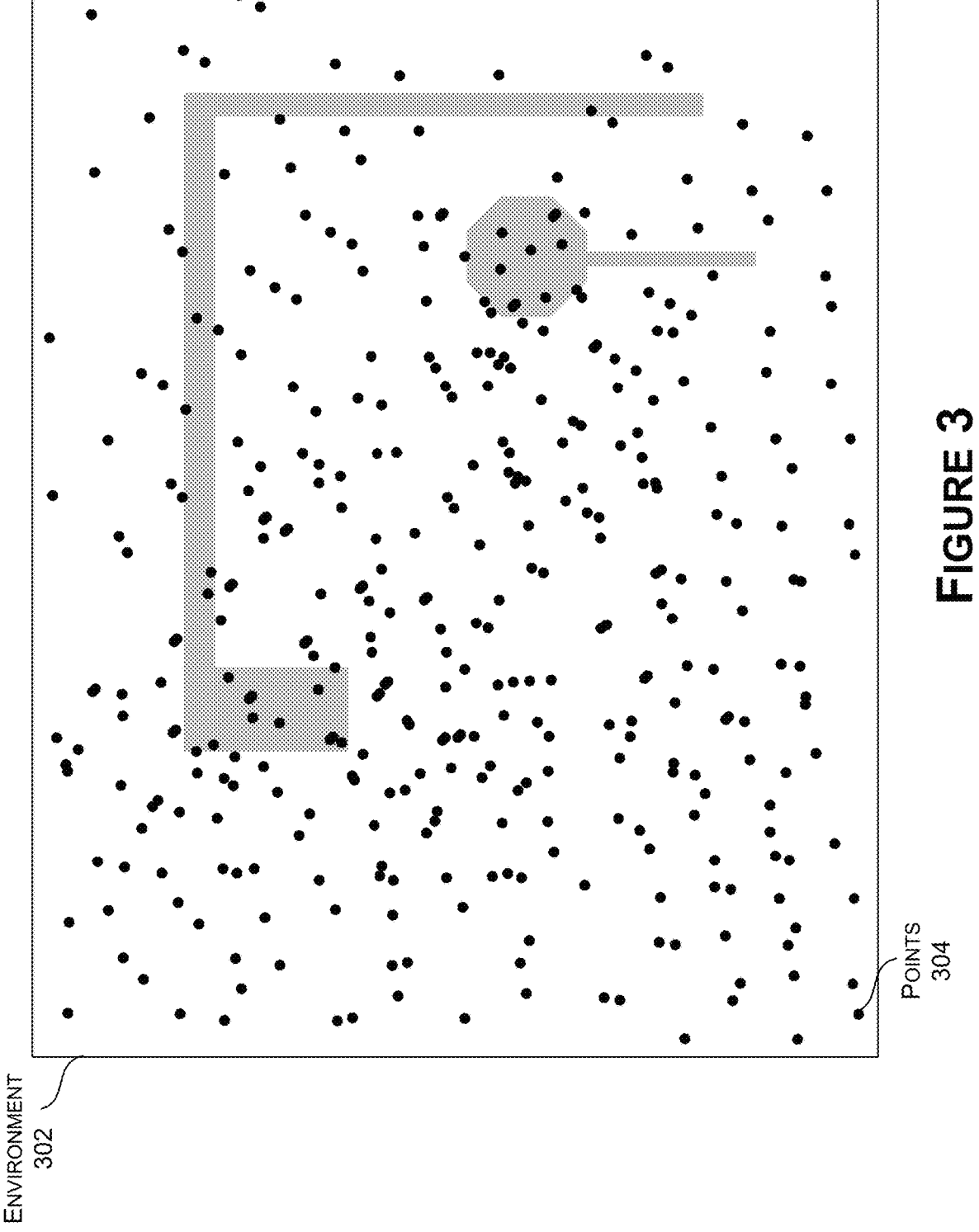
FIG. 3 illustrates an example of points within an environment, in accordance with some embodiments of the present disclosure.

For instance, FIG. 3 illustrates an example of points within the environment 204, in accordance with some embodiments of the present disclosure. As shown, the example of FIG. 3 illustrates only a portion of the environment 204, which is represented by environment 302. Additionally, while navigating the environment 204, the vehicle 202 may have used one or more sensors, such as one or more LIDAR sensors, to generate sensors data (e.g., the sensor data 110). The second processing component(s) 108 may then process the sensor data 110 to generate 3D data (e.g., the 3D data 112) representing an occupancy map and/or point cloud associated with the portion of the environment 302. For instance, and as shown, the portion of the environment 302 includes a number of points 304 (although only one is labeled for clarity reasons). As described herein, the points 304 may be associated with one or more attributes, such as locations, distances, angles, intensity values, and/or so forth.

Referring back to the example of FIG. 1, the process 100 may include using a location component 114 to locate objects within environments based at least on the object data 106 (e.g., the 2D image detections) and the 3D data 112 (e.g., the occupancy maps, the point clouds, etc.). For instance, the location component 114 may use a shape component 116 that is configured to determine 3D shapes associated with objects, where the 3D shapes are represented by shapes data 118. As described herein, in some examples, a 3D shape associated with an object may include a frustum with a number of vertices (e.g., corners). In such examples, the shape component 116 may use the bounding shape, a calibration associated with the image sensor(s), and back projection to determine the frustum associated with the object.

For example, the shape component 116 may determine first vertices (e.g., four vertices) for a first plane using the bounding shape and a minimum distance, where a vertex of the first plane is associated with a location (e.g., a x-coordinate, a y-coordinate, a z-coordinate, a distance, an angle, etc.) within the environment. As described herein, the minimum distance may include, but is not limited to, 0.5 meters, 1 meter, 2 meters, 5 meters, and/or any other distance. The shape component 116 may also determine second vertices (e.g., four vertices) for a second plane using the bounding shape and a maximum distance, where a vertex of the second plane is also associated with a location (e.g., a x-coordinate, a y-coordinate, a z-coordinate, a distance, an angle, etc.) within the environment. As described herein, the maximum distance may include, but is not limited to, 5 meters, 10 meters, 15 meters, 20 meters, and/or any other distance. The shape component 116 may then determine the frustum using at least the first plane and the second plane such that the frustum represents a 3D shape within the environment that includes the first vertices and the second vertices. In some examples, the shape component 116 may further determine a depth to the frustum, such as by performing averaging.

Figure 4:
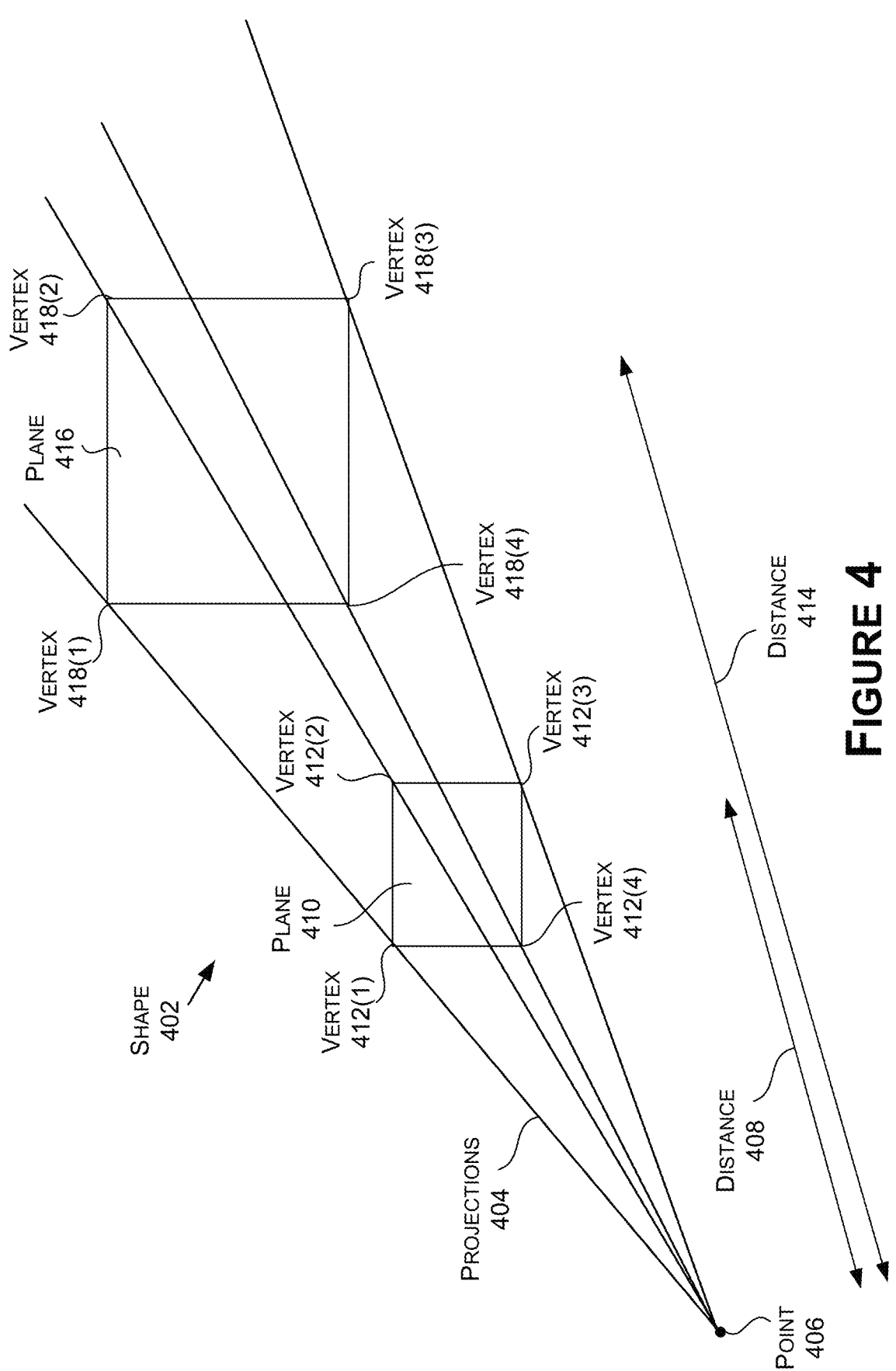
FIG. 4 illustrates an example of determining a 3D shape associated with an object, in accordance with some embodiments of the present disclosure.

For instance, FIG. 4 illustrates an example of determining a 3D shape 402 associated with an object, in accordance with some embodiments of the present disclosure. As shown, the shape component 116 may perform back projection (e.g., using projections 404, although only one is labeled for clarity reasons) from a point 406 (e.g., a focal point) associated with an image sensor that was used to generate the image 214 and using a bounding shape associated with the object to determine the 3D shape 402. In the example of FIG. 4, the bounding shape may include the bounding shape 216(1) associated with the traffic sign 210(1) or the bounding shape 216(2) associated with the traffic signal 210(2). Based at least on performing the projection and using a minimum distance 408, the shape component 116 may determine a first plane 410 associated with the 3D shape 402. As shown, the first plane 410 may include four vertices 412(1)-(4) (also referred to singularly as "vertex 412" or in plural as "vertices 412"), where each vertex 412 is associated with a location within the environment 204. The shape component 116 may also use a maximum distance 414 to determine a second plane 416 associated with the 3D shape 402. As shown, the second plane 416 may also include four vertices 418(1)-(4) (also referred to singularly as "vertex 418" or in plural as "vertices 418"), where each vertex 418 is associated with a location within the environment 204. As such, in the example of FIG. 4, the 3D shape 402 may include a frustum that lies between the first plane 410 and the second plane 416 within the environment 204, where the first plane 410 and the second plane 416 are attached based on the projections 404.

Referring back to the example of FIG. 1, the process 100 may include the location component 114 using a filtering component 120 to determine (e.g., fetch) points from the 3D data 112 that are associated with the 3D shapes for the objects, where the associated points are represented by points data 122. In some examples, the filtering component 120 may use one or more techniques to efficiently determine the points associated with a 3D shape, such as a k-dimensional tree, a Quadtree, an Octree, a Ball tree, and/or any other technique. However, in other examples, the filtering component 120 may analyze all of the points represented by the 3D data 312 when determining which points are associated with a 3D shape. In either of the examples, and for a 3D shape, the filtering component 120 may determine the points as points that are located within the 3D shape within the environment. For example, if the 3D shape includes a frustum, then the filtering component 120 may determine the points as including the points that are located within (e.g., based on the locations of the points) the frustum.

Figure 5A:
FIGS. 5A-5B illustrate examples of determining points that are within 3D shapes associated with objects, in accordance with some embodiments of the present disclosure.
Figure 5B:

For instance, FIGS. 5A-5B illustrate examples of determining points that are within 3D shapes associated with objects, in accordance with some embodiments of the present disclosure. In the example of FIG. 5A, a 3D shape 502

(which may represent, and/or include, the 3D shape 402) may be associated with an object that is planar and/or substantially planar, such as the traffic sign 210(1). As such, points 504 (although only one is labeled for clarity reasons) that correspond to the object may be associated with substantially similar distances since the points are associated with light that reflected off the planar and/or substantially planar surface of the object. For example, if the object includes the traffic sign 210(1), then the points 508 may be associated with light that reflected off the planar surface of the traffic sign 210(1).

In contrast, and in the example of FIG. 5B, a 3D shape 506 (which may represent, and/or include, the 3D shape 402) may be associated with an object that is not substantially planar, such as the traffic signal 210(2). As such, points 508 (although only one is labeled for clarity reasons) that correspond to the object may include varying distances since the points are associated with light that reflected off various surfaces of the object. For example, if the object includes the traffic signal 210(2), then the points 508 may be associated with light that reflected off both the indicators (e.g., the lights) of the traffic signal 210(2) as well as the outer housing of the traffic signal 210(2).

Referring back to the example of FIG. 1, in some examples, the filtering component 120 may use additional and/or alternative techniques for determining the points that are associated with the 3D shapes for the objects. For example, and for a 3D shape, the filtering component 120 may use the intensity values associated with the points as represented by the 3D data 112 to determine which of the points are associated with the 3D shape. In some examples, the filtering component 120 may use the intensity values for certain objects, such as objects that include a surface that is more or less reflective than other surfaces of other objects that are surrounding the object. For example, certain objects, such as traffic signs, usually include surfaces that are more reflective such that the content of the traffic signs is still visible even when there is little light (e.g., at night). As such, if the object includes a traffic sign, the filtering component 120 may further determine the points associated with the traffic sign as points that are associated with higher intensity values as compared to other points (e.g., other, closely located points).

In such an example, the filtering component 120 may use one or more techniques to determine the points that are associated with the object. For example, if the object is again associated with a surface that is more reflective as compared to surfaces of other objects located proximate to the object, then the filtering component 120 may determine that points that are associated with intensity values that satisfy (e.g., are equal to or greater than) an intensity threshold are associated with the object while points that are associated with intensity values that do not satisfy (e.g., are less than) the intensity threshold are not associated with the object. In such an example, the filtering component 120 may use a set intensity threshold and/or the filtering component 120 may dynamically determine an intensity threshold to use for the points. For example, the filtering component 120 may analyze the intensity values associated with points surrounding the 3D shape of the object (and/or all of the points) and, based at least on the analysis, determine the intensity threshold. In such an example, the filtering component 120 may determine the intensity threshold based on an average of the intensity values, a median of the intensity values, a mode of the intensity values, and/or using one or more additional and/or alternative techniques.

The process 100 may include the location component 114 using a characteristics component 124 to determine characteristics associated with the objects using at least the points data 122. For instance, and as described herein, the characteristics associated with an object may include at least the 3D location of the object within the environment. In some examples, the 3D location may correspond to a plane located within the environment that includes a number of vertices (e.g., four vertices), where an individual vertex is associated with a 3D location within the environment. For example, the vertex may be associated with coordinates (e.g., a x-coordinate location, a y-coordinate location, and a z-coordinate location) within the environment, a distance within the environment, an angle within the environment, and/or any other location parameter. However, in other examples, the 3D location may correspond to another type of shape, such as a 3D shape (e.g., a cuboid, a prism, a cube, a cone, a sphere, etc.) that includes any number of vertices.

For a first example, such as for objects that are planar and/or substantially planar (e.g., traffic signs), the characteristics component 124 may fit a plane to the points that are associated with the object (e.g., the points that are within the 3D shape associated with the object). In some examples, the characteristics component 124 may use one or more techniques to fit the plane, such as random sample consensus (RANSAC), maximum likelihood estimate sample consensus (MLESAC), maximum a posterior sample consensus (MAPSAC), and/or any other technique. The characteristics component 124 may then project the bounding shape associated with the object to the plane in order to determine the 3D location of the object within the environment. For instance, the characteristics component 124 may project each corner (e.g., vertex) of the bounding shape to the plane. In some examples, the characteristics component 124 may further adjust the final 3D location, such that the final 3D location is vertical to a ground plane.

For a second example, such as for objects that are not substantially planar (e.g., traffic signals), the characteristics component 124 may determine a plane for the object using the points that are associated with the object (e.g., the points that are within the 3D shape associated with the object). In some examples, the characteristics component 124 determines that the plane is located at the middle of the points, such that the plane represents the center of the object. However, in other examples, the characteristics component 124 may determine that the plane is located at a different location within the points. The characteristics component 124 may then project the bounding shape associated with the object to the plane in order to determine the 3D location of the object within the environment. For instance, the characteristics component 124 may project each corner (e.g., vertex) of the bounding shape to the plane. In some examples, the characteristics component 124 may further adjust the final 3D location, such that the final 3D location is vertical to a ground plane.

Figure 6A:
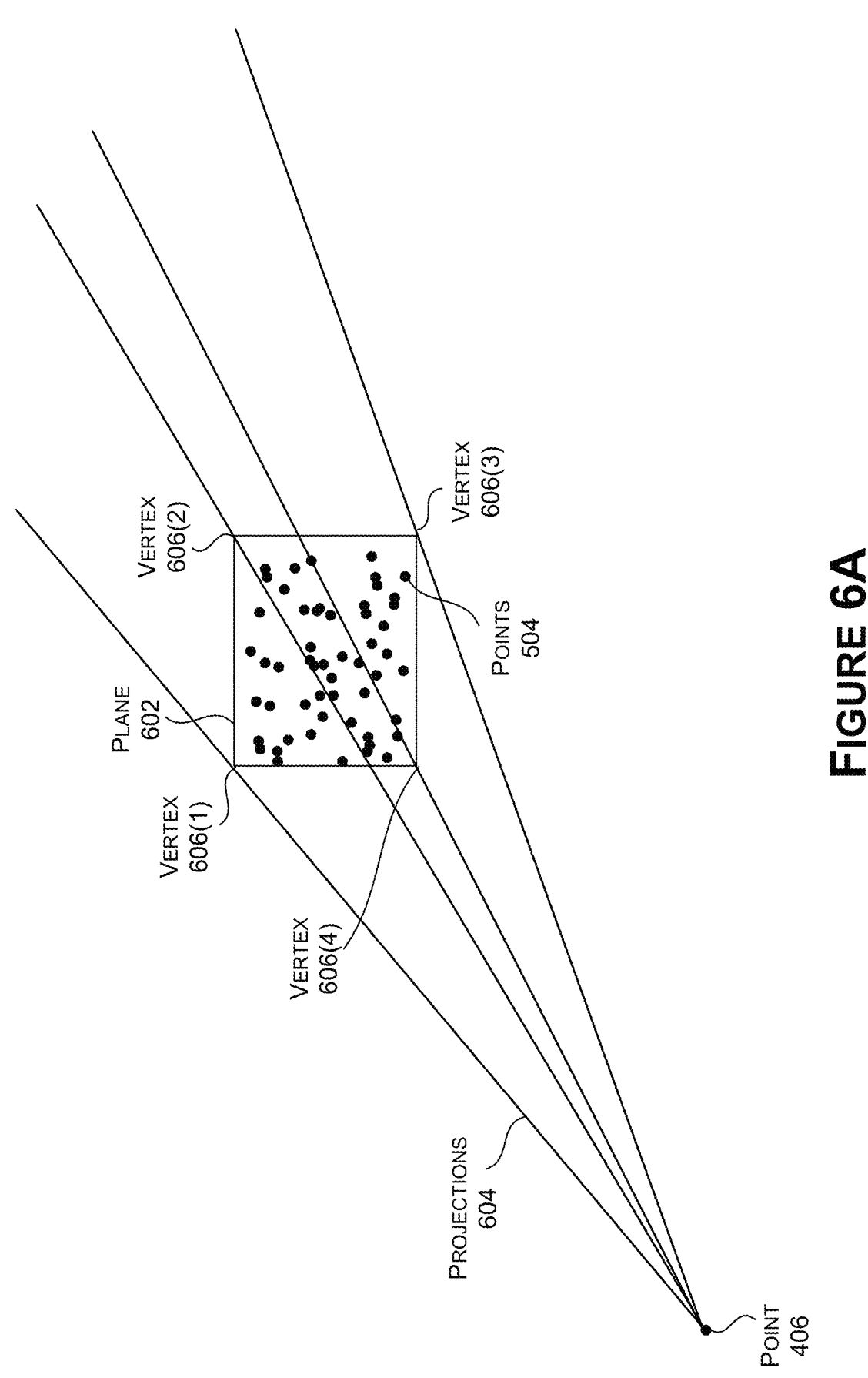
FIGS. 6A-6B illustrate examples of using points to determine 3D locations associated with objects, in accordance with some embodiments of the present disclosure.
Figure 6B:
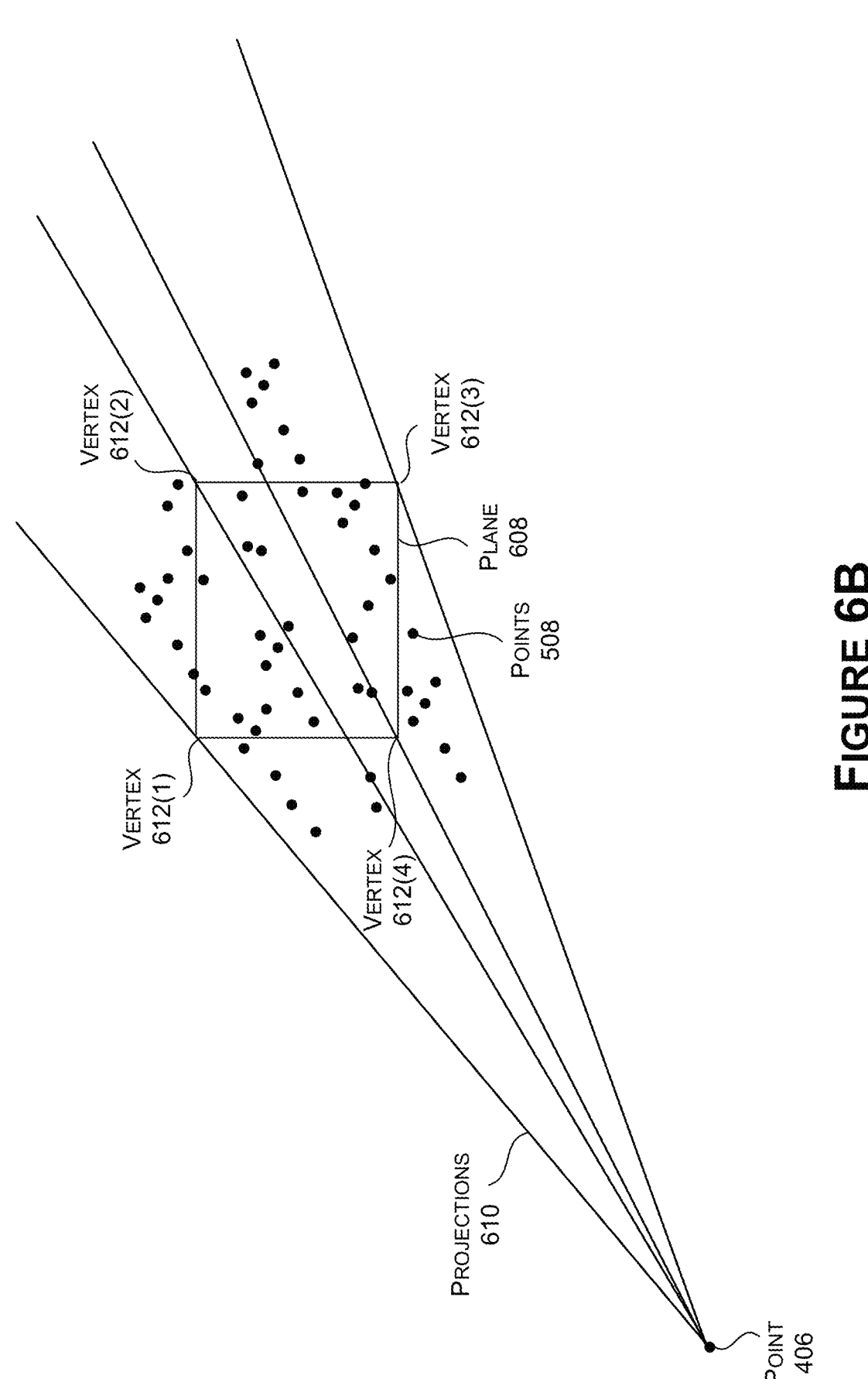

For instance, FIGS. 6A-6B illustrate examples of using points to determine 3D locations associated with objects, in accordance with some embodiments of the present disclosure. For instance, and as show in the example of FIG. 6A, the characteristics component 124 may use one or more of the techniques described herein to fit a plane 602 to the points 504 associated with the object (e.g., the traffic sign 210(1)). For instance, since the points 504 include substantially the same distance from the vehicle 202, the characteristics component 124 may fit the plane 602 such that the points 504 are located on the plane 602. The characteristics component 124 may then project the bounding shape (e.g., the bounding shape 216(1)) to the plane 602, which is represented by projections 604 (although only one is labeled for clarity reasons), to determine the 3D location of the object. For instance, and as shown, the characteristics component 124 may use a back projection algorithm to project each vertex (e.g., each corner) of the bounding shape from the point 406 and back to the plane 602. As such, the plane 602 representing the 3D shape may be associated with vertices 606(1)-(4) (also referred to singularly as "vertex 606" or in plural as "vertices 606"), where each vertex 606 is associated with a 3D location within the environment 204.

Next, and as show in the example of FIG. 6B, the characteristics component 124 may use one or more of the techniques described herein to determine a center of a plane 608 using the points 508 associated with the object (e.g., the traffic signal 210(2)). As described herein, in some examples and as illustrated by the example of FIG. 6B, the characteristics component 124 may determine that the plane 608 is located at a middle of the points 508. The characteristics component 124 may then project the bounding shape (e.g., the bounding shape 216(2)) to the plane 608, which is represented by projections 610 (although only one is labeled for clarity reasons), to determine the 3D location of the object. For instance, and as shown, the characteristics component 124 may use a back projection algorithm to project each vertex (e.g., each corner) of the bounding shape from the point 406 and back to the plane 608. As such, the plane 608 representing the 3D location may be associated with vertices 612(1)-(4) (also referred to singularly as "vertex 612" or in plural as "vertices 612"), where each vertex 612 is associated with a 3D location within the environment 204.

Referring back to the example of FIG. 1, in some examples, the characteristics component 124 may use one or more additional and/or alternative techniques when determining the 3D location associated with an object. For example, and again if the object is a traffic signal that includes one or more indicators (e.g., one or more lights), the characteristics component 124 may determine a number of the indicator(s) and/or an orientation associated with the indicator(s). The characteristics component 124 may then determine a geometry associated with the traffic signal, such a height and/or a width of the traffic signal, based at least on the number of the indicator(s) and/or the orientation associated with the indicator(s). For example, if the traffic signal includes three indicators that are centered vertically, then the characteristics component 124 may use that number of indicators and/or the orientation of the indicators to determine that the geometry associated with the traffic signal includes a height to width ratio of 3 to 1. The characteristics component 124 may then determine the 3D location of the traffic signal such that the plane associated with the 3D location includes a similar geometry as the geometry of the traffic signal. For example, the characteristics component 124 may determine the plane such that a height to width ratio of the plane includes a same ratio as a height of width ratio of the geometry of the traffic signal.

Figure 7:
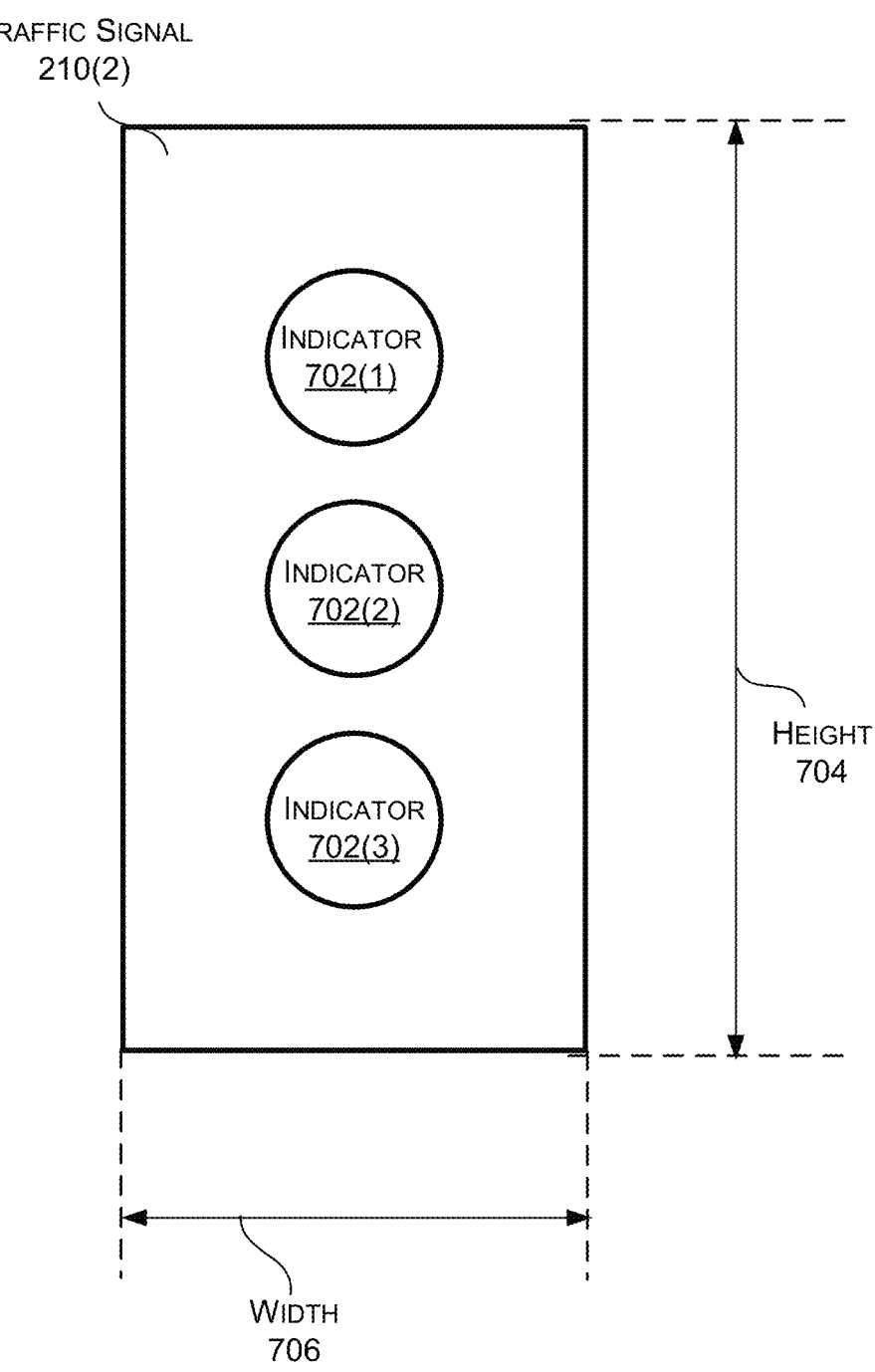
FIG. 7 illustrates an example of determining a geometry associated with an object, where the geometry may be used to determine a 3D location of the object, in accordance with some embodiments of the present disclosure.

For instance, FIG. 7 illustrates an example of determining a geometry associated with an object, where the geometry may be used to determine a 3D location of the object, in accordance with some embodiments of the present disclosure. As shown, the characteristics component 124 may determine that the traffic signal 210(2) includes three indicators 702(1)-(3) (also referred to singularly as "indicator 702" or in plural as "indicators 702") that are oriented vertically with respect to one another. As such, the characteristics component 124 may determine that a geometry of the traffic signal 210(2) should approximately have a ratio where a height 704 is three times larger than a width 706. The characteristics component 124 may then use this geometry to determine the 3D location associated with the traffic signal 210(2). For example, the characteristics component 124 may adjust a ratio of the plane associated with the 3D location to include the ratio associated with the determined geometry.

Referring back to the example of FIG. 1, in some examples, the characteristics component 124 may perform one or more techniques to determine orientations associated with the objects. For instance, such as when the object includes a traffic object (e.g., a traffic signal, a traffic sign, etc.) that provides information (e.g., light indicators, content, etc.) to users, the characteristics component 124 may determine an orientation of the traffic object based at least on a direction of travel associated with the vehicle. For example, since traffic objects are usually oriented such that the information is directed substantially towards the users, the characteristics component 124 may determine that the traffic object is oriented in a direction that is opposite (and/or substantially opposite, such as within an angle threshold) to the direction of travel of the object.

For instance, and referring back to the example of FIG. 2A, the characteristics component 124 may determine the direction of travel 206 associated with the vehicle 202. In the example of FIG. 2A, the direction of travel may include east, 90 degrees, and/or the like. As such, the characteristics component 124 may then determine that the orientation 212(1) of the traffic sign 210(1) is in a direction that is substantially opposite to the direction of travel 206 of the vehicle, which is indicated by the arrow. For instance, in the example of FIG. 2A, the characteristics component 124 may determine that the orientation 212(1) is west, 270 degrees, and/or the like. Additionally, the characteristics component 124 may determine that the orientation 212(2) of the traffic signal 210(2) is also in a direction that is substantially opposite to the direction of travel 206 of the vehicle, which is also indicated by the arrow. For instance, in the example of FIG. 2A, the characteristics component 124 may determine that the orientation 212(2) is west, 270 degrees, and/or the like.

Referring back to the example of FIG. 1, the process 100 may include the location component 114 generating and/or outputting characteristics data 126 associated with objects. As described herein, and for an object, the characteristics data 126 may represent a classification associated with the object (which may be represented by the object data 106), the 3D location associated with the object, the orientation associated with the object, and/or any other information associated with the object. In some examples, the classification may include a general classification, such as traffic object, pedestrian, vehicle, structure, and/or the like. In some examples, the classification may include a more specific classification. For example, if the object includes a traffic sign, then the classification may include speed limit sign, speed limit 50 MPH sign, speed limit 75 MPH sign, stop sign, crosswalk sign, and/or any other type of traffic sign.

In some examples, the vehicle and/or a remote system(s) may perform one or more processes using the characteristics data 126. For a first example, such as if the location component 114 is executing on the vehicle while the vehicle is navigating around an environment, the vehicle may use the information represented by the characteristics data 126 to help navigate the vehicle through the environment. For instance, one or more systems of the vehicle, such as the planning system, may use the characteristics data 126 to determine additional information associated with one or more objects located within the environment. The system(s) of the vehicle may then use the additional information to determine how to proceed within the environment, such as by determining one or more paths for navigating within the environment.

For a second example, the vehicle and/or the remote system(s) may use the characteristics data 126 to update one or more maps, such as the occupancy map represented by the 3D data 112. For instance, and for an object, the vehicle and/or the remote system(s) may use the characteristics data 126 to update the location of the object on the map(s), the orientation of the object on the map(s), the classification of the object on the map(s), and/or any other information associated with the object on the map(s).

Now referring to FIG. 8-10, each block of methods 800, 900, and 1000, described herein, comprises a computing process that may be performed using any combination of hardware, firmware, and/or software. For instance, various functions may be carried out by a processor executing instructions stored in memory. The methods 800, 900, and 1000 may also be embodied as computer-usable instructions stored on computer storage media. The methods 800, 900, and 1000 may be provided by a standalone application, a service or hosted service (standalone or in combination with another hosted service), or a plug-in to another product, to name a few. In addition, the methods 800, 900, and 1000 are described, by way of example, with respect to FIG. 1. However, these methods 800, 900, and 1000 may additionally or alternatively be executed by any one system, or any combination of systems, including, but not limited to, those described herein.

FIG. 8 illustrates a flow diagram showing a method 800 for localizing an object within an environment, in accordance with some embodiments of the present disclosure. The method 800, at block B802, may include determining, based at least on image data representative of an image, a bounding shape associated with an object. For instance, the first processing component(s) 102 may process the image data 104 generated using one or more image sensors of a vehicle (and/or other type of machine), where the image data 104 represents the image depicting at least the object. Based at least on the processing, the first processing component(s) 102 may determine the bounding shape associated with the object. In some examples, the bounding shape includes vertices, where an individual vertex is associated with a location (e.g., coordinates, a pixel location, etc.) of the image.

The process 800, at block B804, may include determining, based at least on the bounding shape, a three-dimensional (3D) shape associated with the object. For instance, the location component 114 (e.g., the shape component 116) may use the bounding shape to determine the 3D shape associated with the object. As described herein, in some examples, the 3D shape includes a frustum that is generated by projecting the bounding shape. For example, the frustum may include a first plane that is associated with a minimum distance from the vehicle and a second plan that is associated with a maximum distance from the vehicle. Additionally, the frustum may include vertices, where an individual vertex is associated with a location (e.g., coordinates, a distance, an angle, etc.) within the environment.

The process 800, at block B806, may include determining, based at least on the 3D shape, one or more points that correspond to the object. For instance, the location component 114 (e.g., the filtering component 120) may use the 3D shape to determine the point(s) that is associated with the object. In some examples, and as described herein, the location component 114 determines the point(s) based at least on the point(s) being located within the 3D shape. Additionally, in some examples, the location component 114 may use additional techniques to determine the point(s). For example, the location component 114 may use the intensity value(s) associated with the point(s) to determine that the point(s) is associated with the object.

The method 800, at block B808, may include determining, based at least on the one or more points, a 3D location associated with the object. For instance, the location component 114 (e.g., the characteristics component 124) may use the point(s) to determine the 3D location. As described herein, in some examples, the location component 114 may initially use the point(s) to determine a plane associated with the object. The location component 114 may then project the bounding shape associated with the object to the plane to determine the 3D location. For instance, the 3D location may include a final plane that includes vertices, where an individual vertex is associated with a location (e.g., coordinates, a distance, an angle, etc.) within the environment.

FIG. 9 illustrates a flow diagram showing a method 900 for localizing an object within an environment, in accordance with some embodiments of the present disclosure. The method 900, at block B902, may include determining, based at least on image data representative of an image, a bounding shape associated with an object. For instance, the first processing component(s) 102 may process the image data 104 generated using one or more image sensors of a vehicle (and/or other type of machine), where the image data 104 represents the image depicting at least the object. Based at least on the processing, the first processing component(s) 102 may determine the bounding shape associated with the object. In some examples, the bounding shape includes vertices, where an individual vertex is associated with a location (e.g., coordinates, a pixel location, etc.) of the image.

The process 900, at block B904, may include determining, based at least on the bounding shape, one or more points that correspond to the object. For instance, the location component 114 (e.g., the filtering component 120) may use the bounding shape to determine the point(s) that is associated with the object. In some examples, and as described herein, the location component 114 initially determines a 3D shape, such as a frustum, using the bounding shape. The location component 114 may then determine that the point(s) is located within the 3D shape.

The method 900, at block B906, may include determining, based at least on the one or more points, a location of a plane associated with the object. For instance, the location component 114 (e.g., the characteristics component 124) may use the point(s) to determine a location of a point on the object. In some examples, and as described herein, the location of the point may correspond to a center of the object and the location component 114 may determine the center of the object as the middle of the point(s) associated with the object. The location component 114 may then determine that the plane is located at the point.

The method 900, at block B908, may include determining, based at least on the plane, a three-dimensional (3D) location associated with the object. For instance, the location component 114 (e.g., the characteristics component 124) may determine the 3D location associated with the object using at least the plane. As described herein, in some examples, the location component 114 may determine the 3D location by projecting the bounding shape to the plane. As such, the plane may include vertices, where an individual vertex is associated with a location (e.g., coordinates, a distance, an angle, etc.) within the environment. In some examples, the location component 114 may then adjust a shape of the plane based on one or more characteristics of the object, such as an orientation of one or more indicators and/or a number of the indictor(s) associated with the object.

FIG. 10 illustrates a flow diagram showing a method 1000 for updating a geometry associated with a 3D location of an object, in accordance with some embodiments of the present disclosure. The method 1000, at block B1002, may include determining, based at least on sensor data, a first geometry associated with a first three-dimensional (3D) location of an object. For instance, the location component 114 (e.g., the characteristics component 124) may perform one or more of the processes described herein to determine the first 3D location of the object. As described herein, the first 3D location may be associated with a plane that includes the first geometry, such as a height and a width.

The method 1000, at block B1004, may include determining, based at least on one or more characteristics associate with the object, a second geometry associated with the object. For instance, the location component 114 (e.g., the characteristics component 124) may determine the characteristic(s), such as the number of indicators associated with the object and/or an orientation of one or more indicators associated with the object. The location component 114 may then determine the second geometry based at least on the characteristic(s). For example, the location component 114 may determine at least a height to width ratio of the second geometry based at least on the number of indicators and/or the orientation of the indicator(s).

The method 1000, at block B1006, may include determining, based at least on the first geometry and the second geometry, a third geometry associated with a second 3D location of the object. For instance, the location component 114 (e.g., the characteristics component 124) may update the first geometry based at least on the second geometry in order to determine the third geometry. As described herein, in some examples, updating the first geometry may include causing a height to width ratio of the first geometry to match a height to width ratio of the second geometry. As such, the third geometry may represent the second 3D location of the object.

Example Autonomous Vehicle

Figure 11A:
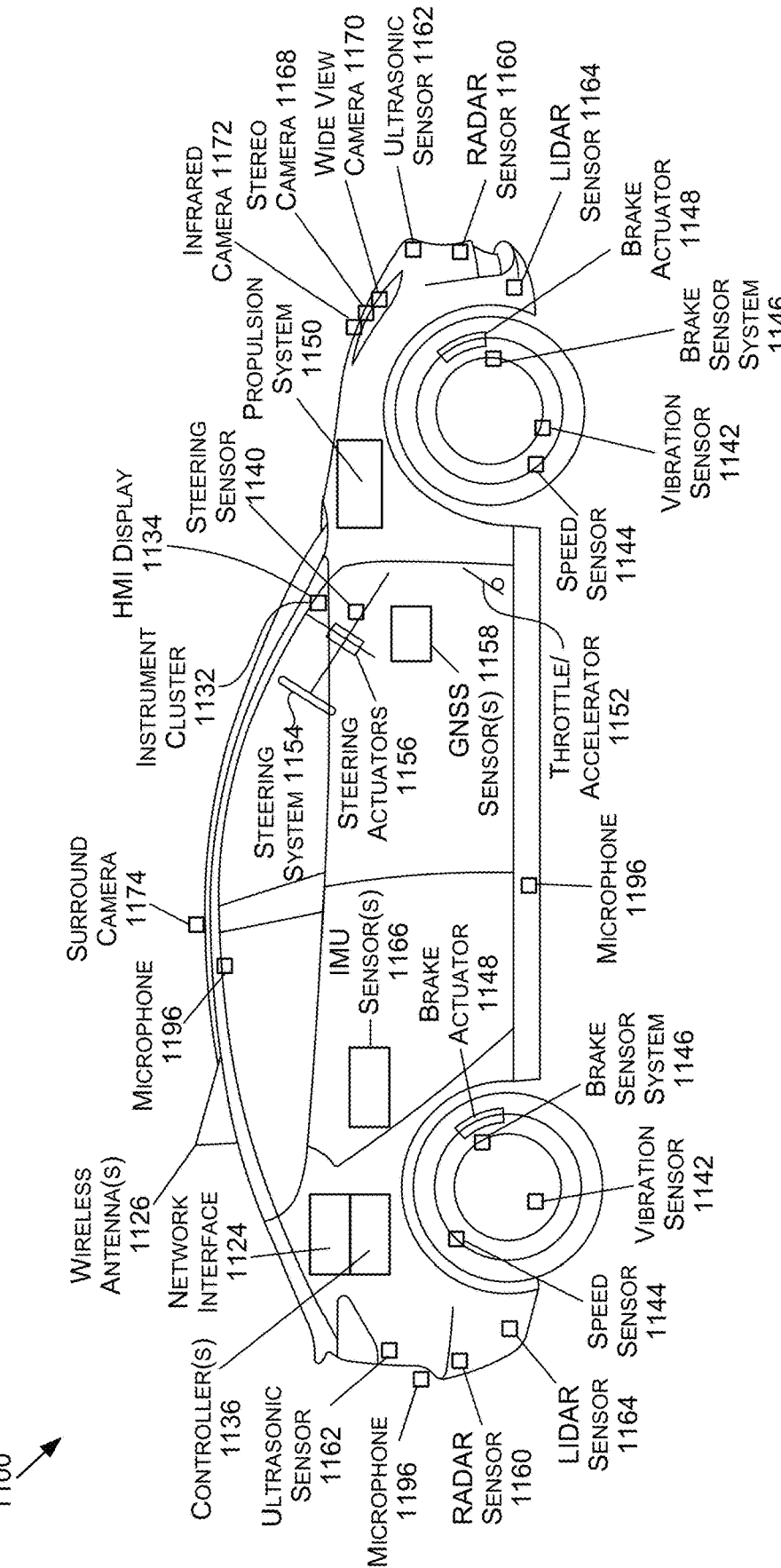
FIG. 11A is an illustration of an example autonomous vehicle, in accordance with some embodiments of the present disclosure.

FIG. 11A is an illustration of an example autonomous vehicle 1100, in accordance with some embodiments of the present disclosure. The autonomous vehicle 1100 (alternatively referred to herein as the "vehicle 1100") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1100 may be capable of functionality in accordance with one or more of Level 3-Level 5 of the autonomous driving levels. The vehicle 1100 may be capable of functionality in accordance with one or more of Level 1-Level 5 of the autonomous driving levels. For example, the vehicle 1100 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1100 or other machine, such as being fully autonomous, being highly autonomous, being conditionally autonomous, being partially autonomous, providing assistive autonomy, being semi-autonomous, being primarily autonomous, or other designation.

The vehicle 1100 may include components such as a chassis, a vehicle body, wheels (e.g., 2, 4, 6, 8, 18, etc.), tires, axles, and other components of a vehicle. The vehicle 1100 may include a propulsion system 1150, such as an internal combustion engine, hybrid electric power plant, an all-electric engine, and/or another propulsion system type. The propulsion system 1150 may be connected to a drive train of the vehicle 1100, which may include a transmission, to enable the propulsion of the vehicle 1100. The propulsion system 1150 may be controlled in response to receiving signals from the throttle/accelerator 1152.

A steering system 1154, which may include a steering wheel, may be used to steer the vehicle 1100 (e.g., along a desired path or route) when the propulsion system 1150 is operating (e.g., when the vehicle is in motion). The steering system 1154 may receive signals from a steering actuator 1156. The steering wheel may be optional for full automation (Level 5) functionality.

The brake sensor system 1146 may be used to operate the vehicle brakes in response to receiving signals from the brake actuators 1148 and/or brake sensors.

Controller(s) 1136, which may include one or more system on chips (SoCs) 1104 (FIG. 11C) and/or GPU(s), may provide signals (e.g., representative of commands) to one or more components and/or systems of the vehicle 1100. For example, the controller(s) may send signals to operate the vehicle brakes via one or more brake actuators 1148, to operate the steering system 1154 via one or more steering actuators 1156, to operate the propulsion system 1150 via one or more throttle/accelerators 1152. The controller(s) 1136 may include one or more onboard (e.g., integrated) computing devices (e.g., supercomputers) that process sensor signals, and output operation commands (e.g., signals representing commands) to enable autonomous driving and/or to assist a human driver in driving the vehicle 1100. The controller(s) 1136 may include a first controller 1136 for autonomous driving functions, a second controller 1136 for functional safety functions, a third controller 1136 for artificial intelligence functionality (e.g., computer vision), a fourth controller 1136 for infotainment functionality, a fifth controller 1136 for redundancy in emergency conditions, and/or other controllers. In some examples, a single controller 1136 may handle two or more of the above functionalities, two or more controllers 1136 may handle a single functionality, and/or any combination thereof.

The controller(s) 1136 may provide the signals for controlling one or more components and/or systems of the vehicle 1100 in response to sensor data received from one or more sensors (e.g., sensor inputs). The sensor data may be received from, for example and without limitation, global navigation satellite systems ("GNSS") sensor(s) 1158 (e.g., Global Positioning System sensor(s)), RADAR sensor(s) 1160, ultrasonic sensor(s) 1162, LIDAR sensor(s) 1164, inertial measurement unit (IMU) sensor(s) 1166 (e.g., accel-erometer(s), gyroscope(s), magnetic compass(es), magnetometer(s), etc.), microphone(s) 1196, stereo camera(s) 1168, wide-view camera(s) 1170 (e.g., fisheye cameras), infrared camera(s) 1172, surround camera(s) 1174 (e.g., 360 degree cameras), long-range and/or mid-range camera(s) 1198, speed sensor(s) 1144 (e.g., for measuring the speed of the vehicle 1100), vibration sensor(s) 1142, steering sensor(s) 1140, brake sensor(s) (e.g., as part of the brake sensor system 1146), and/or other sensor types.

One or more of the controller(s) 1136 may receive inputs (e.g., represented by input data) from an instrument cluster 1132 of the vehicle 1100 and provide outputs (e.g., represented by output data, display data, etc.) via a human-machine interface (HMI) display 1134, an audible annunciator, a loudspeaker, and/or via other components of the vehicle 1100. The outputs may include information such as vehicle velocity, speed, time, map data (e.g., the High Definition ("HD") map 1122 of FIG. 11C), location data (e.g., the vehicle's 1100 location, such as on a map), direction, location of other vehicles (e.g., an occupancy grid), information about objects and status of objects as perceived by the controller(s) 1136, etc. For example, the HMI display 1134 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1100 further includes a network interface 1124 which may use one or more wireless antenna(s) 1126 and/or modem(s) to communicate over one or more networks. For example, the network interface 1124 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1126 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 11B:
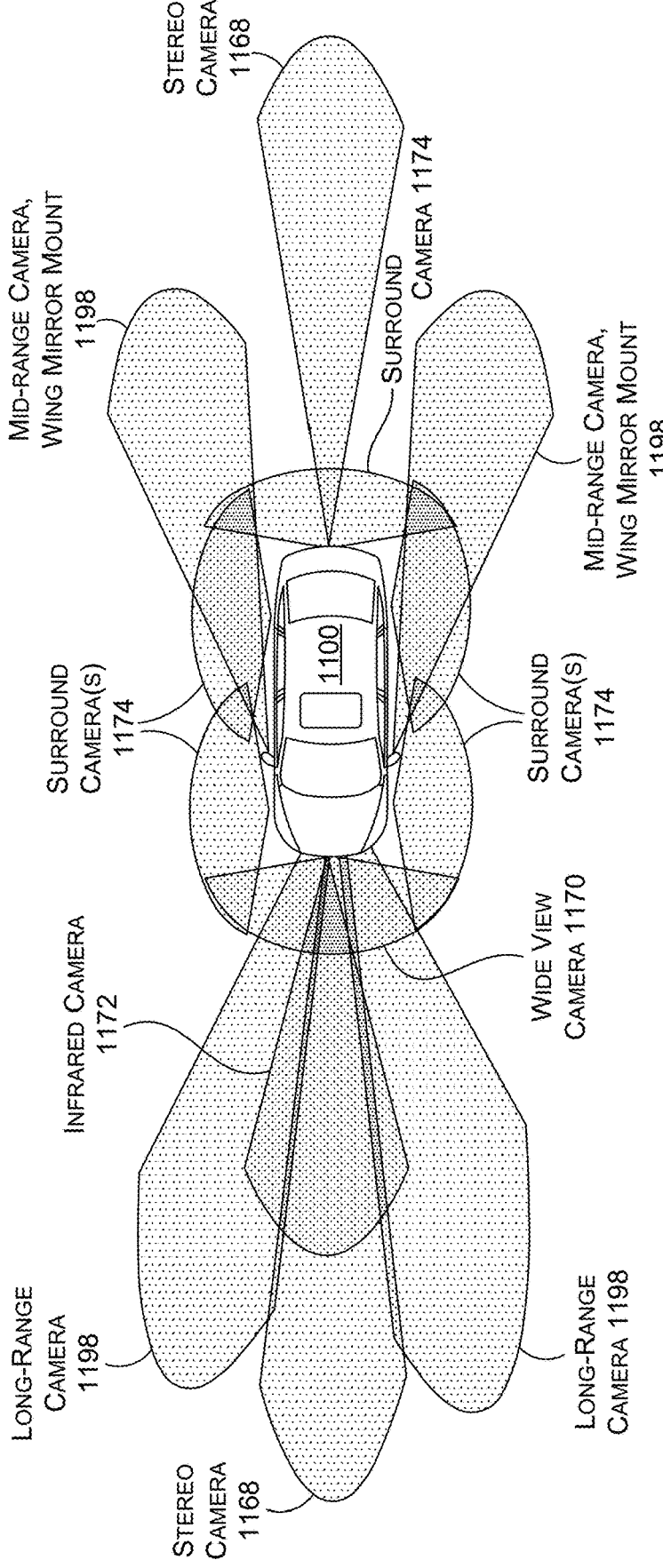
FIG. 11B is an example of camera locations and fields of view for the example autonomous vehicle of FIG. 11A, in accordance with some embodiments of the present disclosure.

FIG. 11B is an example of camera locations and fields of view for the example autonomous vehicle 1100 of FIG. 11A, in accordance with some embodiments of the present disclosure. The cameras and respective fields of view are one example embodiment and are not intended to be limiting. For example, additional and/or alternative cameras may be included and/or the cameras may be located at different locations on the vehicle 1100.

The camera types for the cameras may include, but are not limited to, digital cameras that may be adapted for use with the components and/or systems of the vehicle 1100. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1100 (e.g., front-facing cameras) may be used for surround view, to help identify forward facing paths and obstacles, as well aid in, with the help of one or more controllers 1136 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1170 that may be used to perceive objects coming into view from the periphery (e.g., pedestrians, crossing traffic or bicycles). Although only one wide-view camera is illustrated in FIG. 11B, there may be any number (including zero) of wide-view cameras 1170 on the vehicle 1100. In addition, any number of long-range camera(s) 1198 (e.g., a long-view stereo camera pair) may be used for depth-based object detection, especially for objects for which a neural network has not yet been trained. The long-range camera(s) 1198 may also be used for object detection and classification, as well as basic object tracking.

Any number of stereo cameras 1168 may also be included in a front-facing configuration. In at least one embodiment, one or more of stereo camera(s) 1168 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1168 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1168 may be used in addition to, or alternatively from, those described herein.

Cameras with a field of view that include portions of the environment to the side of the vehicle 1100 (e.g., side-view cameras) may be used for surround view, providing information used to create and update the occupancy grid, as well as to generate side impact collision warnings. For example, surround camera(s) 1174 (e.g., four surround cameras 1174 as illustrated in FIG. 11B) may be positioned to on the vehicle 1100. The surround camera(s) 1174 may include wide-view camera(s) 1170, fisheye camera(s), 360 degree camera(s), and/or the like. Four example, four fisheye cameras may be positioned on the vehicle's front, rear, and sides. In an alternative arrangement, the vehicle may use three surround camera(s) 1174 (e.g., left, right, and rear), and may leverage one or more other camera(s) (e.g., a forward-facing camera) as a fourth surround view camera.

Cameras with a field of view that include portions of the environment to the rear of the vehicle 1100 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1198, stereo camera(s) 1168), infrared camera(s) 1172, etc.), as described herein.

Figure 11C:
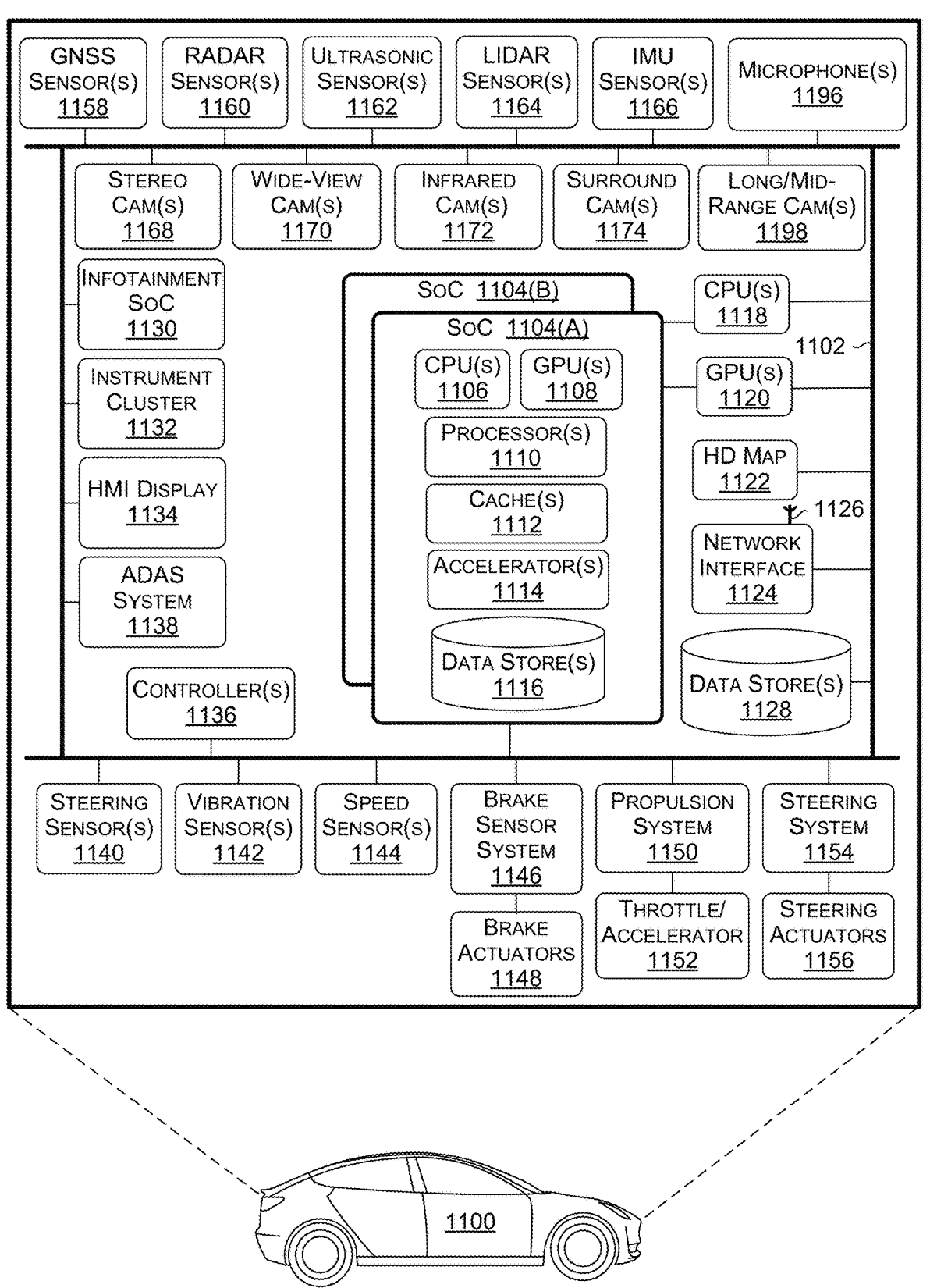
FIG. 11C is a block diagram of an example system architecture for the example autonomous vehicle of FIG. 11A, in accordance with some embodiments of the present disclosure.

FIG. 11C is a block diagram of an example system architecture for the example autonomous vehicle 1100 of FIG. 11A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1100 in FIG. 11C are illustrated as being connected via bus 1102. The bus 1102 may include a Controller Area Network (CAN) data interface (alternatively referred to herein as a "CAN bus"). A CAN may be a network inside the vehicle 1100 used to aid in control of various features and functionality of the vehicle 1100, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1102 is described herein as being a CAN bus, this is not intended to be limiting. For example, in addition to, or alternatively from, the CAN bus, FlexRay and/or Ethernet may be used. Additionally, although a single line is used to represent the bus 1102, this is not intended to be limiting. For example, there may be any number of busses 1102, which may include one or more CAN busses, one or more FlexRay busses, one or more Ethernet busses, and/or one or more other types of busses using a different protocol. In some examples, two or more busses 1102 may be used to perform different functions, and/or may be used for redundancy. For example, a first bus 1102 may be used for collision avoidance functionality and a second bus 1102 may be used for actuation control. In any example, each bus 1102 may communicate with any of the components of the vehicle 1100, and two or more busses 1102 may communicate with the same components. In some examples, each SoC 1104, each controller 1136, and/or each computer within the vehicle may have access to the same input data (e.g., inputs from sensors of the vehicle 1100), and may be connected to a common bus, such the CAN bus.

The vehicle 1100 may include one or more controller(s) 1136, such as those described herein with respect to FIG. 11A. The controller(s) 1136 may be used for a variety of functions. The controller(s) 1136 may be coupled to any of the various other components and systems of the vehicle 1100, and may be used for control of the vehicle 1100, artificial intelligence of the vehicle 1100, infotainment for the vehicle 1100, and/or the like.

The vehicle 1100 may include a system(s) on a chip (SoC) 1104. The SoC 1104 may include CPU(s) 1106, GPU(s) 1108, processor(s) 1110, cache(s) 1112, accelerator(s) 1114, data store(s) 1116, and/or other components and features not illustrated. The SoC(s) 1104 may be used to control the vehicle 1100 in a variety of platforms and systems. For example, the SoC(s) 1104 may be combined in a system (e.g., the system of the vehicle 1100) with an HD map 1122 which may obtain map refreshes and/or updates via a network interface 1124 from one or more servers (e.g., server(s) 1178 of FIG. 11D).

The CPU(s) 1106 may include a CPU cluster or CPU complex (alternatively referred to herein as a "CCPLEX"). The CPU(s) 1106 may include multiple cores and/or L2 caches. For example, in some embodiments, the CPU(s) 1106 may include eight cores in a coherent multi-processor configuration. In some embodiments, the CPU(s) 1106 may include four dual-core clusters where each cluster has a dedicated L2 cache (e.g., a 2 MB L2 cache). The CPU(s) 1106 (e.g., the CCPLEX) may be configured to support simultaneous cluster operation enabling any combination of the clusters of the CPU(s) 1106 to be active at any given time.

The CPU(s) 1106 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1106 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1108 may include an integrated GPU (alternatively referred to herein as an "iGPU"). The GPU(s) 1108 may be programmable and may be efficient for parallel workloads. The GPU(s) 1108, in some examples, may use an enhanced tensor instruction set. The GPU(s) 1108 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1108 may include at least eight streaming microprocessors. The GPU(s) 1108 may use compute application programming interface(s) (API(s)). In addition, the GPU(s) 1108 may use one or more parallel computing platforms and/or programming models (e.g., NVIDIA's CUDA).

The GPU(s) 1108 may be power-optimized for best performance in automotive and embedded use cases. For example, the GPU(s) 1108 may be fabricated on a Fin field-effect transistor (FinFET). However, this is not intended to be limiting and the GPU(s) 1108 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1108 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1108 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1108 to access the CPU(s) 1106 page tables directly. In such examples, when the GPU(s) 1108 memory management unit (MMU) experiences a miss, an address translation request may be transmitted to the CPU(s) 1106. In response, the CPU(s) 1106 may look in its page tables for the virtual-to-physical mapping for the address and transmits the translation back to the GPU(s) 1108. As such, unified memory technology may allow a single unified virtual address space for memory of both the CPU(s) 1106 and the GPU(s) 1108, thereby simplifying the GPU(s) 1108 programming and porting of applications to the GPU(s) 1108.

In addition, the GPU(s) 1108 may include an access counter that may keep track of the frequency of access of the GPU(s) 1108 to memory of other processors. The access counter may help ensure that memory pages are moved to the physical memory of the processor that is accessing the pages most frequently.

The SoC(s) 1104 may include any number of cache(s) 1112, including those described herein. For example, the cache(s) 1112 may include an L3 cache that is available to both the CPU(s) 1106 and the GPU(s) 1108 (e.g., that is connected both the CPU(s) 1106 and the GPU(s) 1108). The cache(s) 1112 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1104 may include an arithmetic logic unit(s) (ALU(s)) which may be leveraged in performing processing with respect to any of the variety of tasks or operations of the vehicle 1100—such as processing DNNs. In addition, the SoC(s) 1104 may include a floating point unit(s) (FPU(s))— or other math coprocessor or numeric coprocessor types— for performing mathematical operations within the system. For example, the SoC(s) 104 may include one or more FPUs integrated as execution units within a CPU(s) 1106 and/or GPU(s) 1108.

The SoC(s) 1104 may include one or more accelerators 1114 (e.g., hardware accelerators, software accelerators, or a combination thereof). For example, the SoC(s) 1104 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1108 and to off-load some of the tasks of the GPU(s) 1108 (e.g., to free up more cycles of the GPU(s) 1108 for performing other tasks). As an example, the accelerator(s) 1114 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1114 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1108, and by using an inference accelerator, for example, a designer may target either the DLA(s) or the GPU(s) 1108 for any function. For example, the designer may focus processing of CNNs and floating point operations on the DLA(s) and leave other functions to the GPU(s) 1108 and/or other accelerator(s) 1114.

The accelerator(s) 1114 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1106. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1114 (e.g., the hardware acceleration cluster) may include a computer vision network on-chip and SRAM, for providing a high-bandwidth, low latency SRAM for the accelerator(s) 1114. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1104 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1114 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.).

The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1166 output that correlates with the vehicle 1100 orientation, distance, 3D location estimates of the object obtained from the neural network and/or other sensors (e.g., LIDAR sensor(s) 1164 or RADAR sensor(s) 1160), among others.

The SoC(s) 1104 may include data store(s) 1116 (e.g., memory). The data store(s) 1116 may be on-chip memory of the SoC(s) 1104, which may store neural networks to be executed on the GPU and/or the DLA. In some examples, the data store(s) 1116 may be large enough in capacity to store multiple instances of neural networks for redundancy and safety. The data store(s) 1112 may comprise L2 or L3 cache(s) 1112. Reference to the data store(s) 1116 may include reference to the memory associated with the PVA, DLA, and/or other accelerator(s) 1114, as described herein.

The SoC(s) 1104 may include one or more processor(s) 1110 (e.g., embedded processors). The processor(s) 1110 may include a boot and power management processor that may be a dedicated processor and subsystem to handle boot power and management functions and related security enforcement. The boot and power management processor may be a part of the SoC(s) 1104 boot sequence and may provide runtime power management services. The boot power and management processor may provide clock and voltage programming, assistance in system low power state transitions, management of SoC(s) 1104 thermals and temperature sensors, and/or management of the SoC(s) 1104 power states. Each temperature sensor may be implemented as a ring-oscillator whose output frequency is proportional to temperature, and the SoC(s) 1104 may use the ring-oscillators to detect temperatures of the CPU(s) 1106, GPU(s) 1108, and/or accelerator(s) 1114. If temperatures are determined to exceed a threshold, the boot and power management processor may enter a temperature fault routine and put the SoC(s) 1104 into a lower power state and/or put the vehicle 1100 into a chauffeur to safe stop mode (e.g., bring the vehicle 1100 to a safe stop).

The processor(s) 1110 may further include a set of embedded processors that may serve as an audio processing engine.

The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1110 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1110 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1110 may further include a real-time camera engine that may include a dedicated processor subsystem for handling real-time camera management.

The processor(s) 1110 may further include a high-dynamic range signal processor that may include an image signal processor that is a hardware engine that is part of the camera processing pipeline.

The processor(s) 1110 may include a video image compositor that may be a processing block (e.g., implemented on a microprocessor) that implements video post-processing functions needed by a video playback application to produce the final image for the player window. The video image compositor may perform lens distortion correction on wide-view camera(s) 1170, surround camera(s) 1174, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1108 is not required to continuously render new surfaces. Even when the GPU(s) 1108 is powered on and active doing 3D rendering, the video image compositor may be used to offload the GPU(s) 1108 to improve performance and responsiveness.

The SoC(s) 1104 may further include a mobile industry processor interface (MIPI) camera serial interface for receiving video and input from cameras, a high-speed interface, and/or a video input block that may be used for camera and related pixel input functions. The SoC(s) 1104 may further include an input/output controller(s) that may be controlled by software and may be used for receiving I/O signals that are uncommitted to a specific role.

The SoC(s) 1104 may further include a broad range of peripheral interfaces to enable communication with peripherals, audio codecs, power management, and/or other devices. The SoC(s) 1104 may be used to process data from cameras (e.g., connected over Gigabit Multimedia Serial Link and Ethernet), sensors (e.g., LIDAR sensor(s) 1164, RADAR sensor(s) 1160, etc. that may be connected over Ethernet), data from bus 1102 (e.g., speed of vehicle 1100, steering wheel position, etc.), data from GNSS sensor(s) 1158 (e.g., connected over Ethernet or CAN bus). The SoC(s) 1104 may further include dedicated high-performance mass storage controllers that may include their own DMA engines, and that may be used to free the CPU(s) 1106 from routine data management tasks.

The SoC(s) 1104 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1104 may be faster, more reliable, and even more energy-efficient and space-efficient than conventional systems. For example, the accelerator(s) 1114, when combined with the CPU(s) 1106, the GPU(s) 1108, and the data store(s) 1116, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1120) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1108.

In some examples, a CNN for facial recognition and vehicle owner identification may use data from camera sensors to identify the presence of an authorized driver and/or owner of the vehicle 1100. The always on sensor processing engine may be used to unlock the vehicle when the owner approaches the driver door and turn on the lights, and, in security mode, to disable the vehicle when the owner leaves the vehicle. In this way, the SoC(s) 1104 provide for security against theft and/or carjacking.

In another example, a CNN for emergency vehicle detection and identification may use data from microphones 1196 to detect and identify emergency vehicle sirens. In contrast to conventional systems, that use general classifiers to detect sirens and manually extract features, the SoC(s) 1104 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1158. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1162, until the emergency vehicle(s) passes.

The vehicle may include a CPU(s) 1118 (e.g., discrete CPU(s), or dCPU(s)), that may be coupled to the SoC(s) 1104 via a high-speed interconnect (e.g., PCIe). The CPU(s) 1118 may include an X86 processor, for example. The CPU(s) 1118 may be used to perform any of a variety of functions, including arbitrating potentially inconsistent results between ADAS sensors and the SoC(s) 1104, and/or monitoring the status and health of the controller(s) 1136 and/or infotainment SoC 1130, for example.

The vehicle 1100 may include a GPU(s) 1120 (e.g., discrete GPU(s), or dGPU(s)), that may be coupled to the SoC(s) 1104 via a high-speed interconnect (e.g., NVIDIA's NVLINK). The GPU(s) 1120 may provide additional artificial intelligence functionality, such as by executing redundant and/or different neural networks, and may be used to train and/or update neural networks based on input (e.g., sensor data) from sensors of the vehicle 1100.

The vehicle 1100 may further include the network interface 1124 which may include one or more wireless antennas 1126 (e.g., one or more wireless antennas for different communication protocols, such as a cellular antenna, a Bluetooth antenna, etc.). The network interface 1124 may be used to enable wireless connectivity over the Internet with the cloud (e.g., with the server(s) 1178 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1100 information about vehicles in proximity to the vehicle 1100 (e.g., vehicles in front of, on the side of, and/or behind the vehicle 1100). This functionality may be part of a cooperative adaptive cruise control functionality of the vehicle 1100.

The network interface 1124 may include a SoC that provides modulation and demodulation functionality and enables the controller(s) 1136 to communicate over wireless networks. The network interface 1124 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1100 may further include data store(s) 1128 which may include off-chip (e.g., off the SoC(s) 1104) storage. The data store(s) 1128 may include one or more storage elements including RAM, SRAM, DRAM, VRAM, Flash, hard disks, and/or other components and/or devices that may store at least one bit of data.

The vehicle 1100 may further include GNSS sensor(s) 1158. The GNSS sensor(s) 1158 (e.g., GPS, assisted GPS sensors, differential GPS (DGPS) sensors, etc.), to assist in mapping, perception, occupancy grid generation, and/or path planning functions. Any number of GNSS sensor(s) 1158 may be used, including, for example and without limitation, a GPS using a USB connector with an Ethernet to Serial (RS-232) bridge.

The vehicle 1100 may further include RADAR sensor(s) 1160. The RADAR sensor(s) 1160 may be used by the vehicle 1100 for long-range vehicle detection, even in darkness and/or severe weather conditions. RADAR functional safety levels may be ASIL B. The RADAR sensor(s) 1160 may use the CAN and/or the bus 1102 (e.g., to transmit data generated by the RADAR sensor(s) 1160) for control and to access object tracking data, with access to Ethernet to access raw data in some examples. A wide variety of RADAR sensor types may be used. For example, and without limitation, the RADAR sensor(s) 1160 may be suitable for front, rear, and side RADAR use. In some example, Pulse Doppler RADAR sensor(s) are used.

The RADAR sensor(s) 1160 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1160 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1100 surroundings at higher speeds with minimal interference from traffic in adjacent lanes. The other two antennae may expand the field of view, making it possible to quickly detect vehicles entering or leaving the vehicle's 1100 lane.

Mid-range RADAR systems may include, as an example, a range of up to 1160 m (front) or 80 m (rear), and a field of view of up to 42 degrees (front) or 1150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1100 may further include ultrasonic sensor(s) 1162. The ultrasonic sensor(s) 1162, which may be positioned at the front, back, and/or the sides of the vehicle 1100, may be used for park assist and/or to create and update an occupancy grid. A wide variety of ultrasonic sensor(s) 1162 may be used, and different ultrasonic sensor(s) 1162 may be used for different ranges of detection (e.g., 2.5 m, 4 m). The ultrasonic sensor(s) 1162 may operate at functional safety levels of ASIL B.

The vehicle 1100 may include LIDAR sensor(s) 1164. The LIDAR sensor(s) 1164 may be used for object and pedestrian detection, emergency braking, collision avoidance, and/or other functions. The LIDAR sensor(s) 1164 may be functional safety level ASIL B. In some examples, the vehicle 1100 may include multiple LIDAR sensors 1164 (e.g., two, four, six, etc.) that may use Ethernet (e.g., to provide data to a Gigabit Ethernet switch).

In some examples, the LIDAR sensor(s) 1164 may be capable of providing a list of objects and their distances for a 360-degree field of view. Commercially available LIDAR sensor(s) 1164 may have an advertised range of approximately 1100 m, with an accuracy of 2 cm-3 cm, and with support for a 1100 Mbps Ethernet connection, for example. In some examples, one or more non-protruding LIDAR sensors 1164 may be used. In such examples, the LIDAR sensor(s) 1164 may be implemented as a small device that may be embedded into the front, rear, sides, and/or corners of the vehicle 1100. The LIDAR sensor(s) 1164, in such examples, may provide up to a 120-degree horizontal and 35-degree vertical field-of-view, with a 200 m range even for low-reflectivity objects. Front-mounted LIDAR sensor(s) 1164 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1100. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1164 may be less susceptible to motion blur, vibration, and/or shock.

The vehicle may further include IMU sensor(s) 1166. The IMU sensor(s) 1166 may be located at a center of the rear axle of the vehicle 1100, in some examples. The IMU sensor(s) 1166 may include, for example and without limitation, an accelerometer(s), a magnetometer(s), a gyroscope(s), a magnetic compass(es), and/or other sensor types. In some examples, such as in six-axis applications, the IMU sensor(s) 1166 may include accelerometers and gyroscopes, while in nine-axis applications, the IMU sensor(s) 1166 may include accelerometers, gyroscopes, and magnetometers.

In some embodiments, the IMU sensor(s) 1166 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1166 may enable the vehicle 1100 to estimate heading without requiring input from a magnetic sensor by directly observing and correlating the changes in velocity from GPS to the IMU sensor(s) 1166. In some examples, the IMU sensor(s) 1166 and the GNSS sensor(s) 1158 may be combined in a single integrated unit.

The vehicle may include microphone(s) 1196 placed in and/or around the vehicle 1100. The microphone(s) 1196 may be used for emergency vehicle detection and identification, among other things.

The vehicle may further include any number of camera types, including stereo camera(s) 1168, wide-view camera(s) 1170, infrared camera(s) 1172, surround camera(s) 1174, long-range and/or mid-range camera(s) 1198, and/or other camera types. The cameras may be used to capture image data around an entire periphery of the vehicle 1100. The types of cameras used depends on the embodiments and requirements for the vehicle 1100, and any combination of camera types may be used to provide the necessary coverage around the vehicle 1100. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 11A and FIG. 11B.

The vehicle 1100 may further include vibration sensor(s) 1142. The vibration sensor(s) 1142 may measure vibrations of components of the vehicle, such as the axle(s). For example, changes in vibrations may indicate a change in road surfaces. In another example, when two or more vibration sensors 1142 are used, the differences between the vibrations may be used to determine friction or slippage of the road surface (e.g., when the difference in vibration is between a power-driven axle and a freely rotating axle).

The vehicle 1100 may include an ADAS system 1138. The ADAS system 1138 may include a SoC, in some examples. The ADAS system 1138 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1160, LIDAR sensor(s) 1164, and/or a camera(s). The ACC systems may include longitudinal ACC and/or lateral ACC. Longitudinal ACC monitors and controls the distance to the vehicle immediately ahead of the vehicle 1100 and automatically adjust the vehicle speed to maintain a safe distance from vehicles ahead. Lateral ACC performs distance keeping, and advises the vehicle 1100 to change lanes when necessary. Lateral ACC is related to other ADAS applications such as LCA and CWS.

CACC uses information from other vehicles that may be received via the network interface 1124 and/or the wireless antenna(s) 1126 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1100), while the I2V communication concept provides information about traffic further ahead. CACC systems may include either or both I2V and V2V information sources. Given the information of the vehicles ahead of the vehicle 1100, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1160, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1160, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1100 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1100 if the vehicle 1100 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1160, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1100 is backing up. Some RCTW systems include AEB to ensure that the vehicle brakes are applied to avoid a crash. RCTW systems may use one or more rear-facing RADAR sensor(s) 1160, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1100, the vehicle 1100 itself must, in the case of conflicting results, decide whether to heed the result from a primary computer or a secondary computer (e.g., a first controller 1136 or a second controller 1136). For example, in some embodiments, the ADAS system 1138 may be a backup and/or secondary computer for providing perception information to a backup computer rationality module. The backup computer rationality monitor may run a redundant diverse software on hardware components to detect faults in perception and dynamic driving tasks. Outputs from the ADAS system 1138 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1104.

In other examples, ADAS system 1138 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1138 may be fed into the primary computer's perception block and/or the primary computer's dynamic driving task block. For example, if the ADAS system 1138 indicates a forward crash warning due to an object immediately ahead, the perception block may use this information when identifying objects. In other examples, the secondary computer may have its own neural network which is trained and thus reduces the risk of false positives, as described herein.

The vehicle 1100 may further include the infotainment SoC 1130 (e.g., an in-vehicle infotainment system (IVI)). Although illustrated and described as a SoC, the infotainment system may not be a SoC, and may include two or more discrete components. The infotainment SoC 1130 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1100. For example, the infotainment SoC 1130 may radios, disk players, navigation systems, video players, USB and Bluetooth connectivity, carputers, in-car entertainment, Wi-Fi, steering wheel audio controls, hands free voice control, a heads-up display (HUD), an HMI display 1134, a telematics device, a control panel (e.g., for controlling and/or interacting with various components, features, and/or systems), and/or other components. The infotainment SoC 1130 may further be used to provide information (e.g., visual and/or audible) to a user(s) of the vehicle, such as information from the ADAS system 1138, autonomous driving information such as planned vehicle maneuvers, trajectories, surrounding environment information (e.g., intersection information, vehicle information, road information, etc.), and/or other information.

The infotainment SoC 1130 may include GPU functionality. The infotainment SoC 1130 may communicate over the bus 1102 (e.g., CAN bus, Ethernet, etc.) with other devices, systems, and/or components of the vehicle 1100. In some examples, the infotainment SoC 1130 may be coupled to a supervisory MCU such that the GPU of the infotainment system may perform some self-driving functions in the event that the primary controller(s) 1136 (e.g., the primary and/or backup computers of the vehicle 1100) fail. In such an example, the infotainment SoC 1130 may put the vehicle 1100 into a chauffeur to safe stop mode, as described herein.

The vehicle 1100 may further include an instrument cluster 1132 (e.g., a digital dash, an electronic instrument cluster, a digital instrument panel, etc.). The instrument cluster 1132 may include a controller and/or supercomputer (e.g., a discrete controller or supercomputer). The instrument cluster 1132 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1130 and the instrument cluster 1132. In other words, the instrument cluster 1132 may be included as part of the infotainment SoC 1130, or vice versa.

FIG. 11D is a system diagram for communication between cloud-based server(s) and the example autonomous vehicle 1100 of FIG. 11A, in accordance with some embodiments of the present disclosure. The system 1176 may include server(s) 1178, network(s) 1190, and vehicles, including the vehicle 1100. The server(s) 1178 may include a plurality of GPUs 1184(A)-1184(H) (collectively referred to herein as GPUs 1184), PCIe switches 1182(A)-1182(H) (collectively referred to herein as PCIe switches 1182), and/or CPUs 1180(A)-1180(B) (collectively referred to herein as CPUs 1180). The GPUs 1184, the CPUs 1180, and the PCIe switches may be interconnected with high-speed interconnects such as, for example and without limitation, NVLink interfaces 1188 developed by NVIDIA and/or PCIe connections 1186. In some examples, the GPUs 1184 are connected via NVLink and/or NVSwitch SoC and the GPUs 1184 and the PCIe switches 1182 are connected via PCIe interconnects. Although eight GPUs 1184, two CPUs 1180, and two PCIe switches are illustrated, this is not intended to be limiting. Depending on the embodiment, each of the server(s) 1178 may include any number of GPUs 1184, CPUs 1180, and/or PCIe switches. For example, the server(s) 1178 may each include eight, sixteen, thirty-two, and/or more GPUs 1184.

The server(s) 1178 may receive, over the network(s) 1190 and from the vehicles, image data representative of images showing unexpected or changed road conditions, such as recently commenced road-work. The server(s) 1178 may transmit, over the network(s) 1190 and to the vehicles, neural networks 1192, updated neural networks 1192, and/or map information 1194, including information regarding traffic and road conditions. The updates to the map information 1194 may include updates for the HD map 1122, such as information regarding construction sites, potholes, detours, flooding, and/or other obstructions. In some examples, the neural networks 1192, the updated neural networks 1192, and/or the map information 1194 may have resulted from new training and/or experiences represented in data received from any number of vehicles in the environment, and/or based on training performed at a datacenter (e.g., using the server(s) 1178 and/or other servers).

The server(s) 1178 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1190, and/or the machine learning models may be used by the server(s) 1178 to remotely monitor the vehicles.

In some examples, the server(s) 1178 may receive data from the vehicles and apply the data to up-to-date real-time neural networks for real-time intelligent inferencing. The server(s) 1178 may include deep-learning supercomputers and/or dedicated AI computers powered by GPU(s) 1184, such as a DGX and DGX Station machines developed by NVIDIA. However, in some examples, the server(s) 1178 may include deep learning infrastructure that use only CPU-powered datacenters.

The deep-learning infrastructure of the server(s) 1178 may be capable of fast, real-time inferencing, and may use that capability to evaluate and verify the health of the processors, software, and/or associated hardware in the vehicle 1100. For example, the deep-learning infrastructure may receive periodic updates from the vehicle 1100, such as a sequence of images and/or objects that the vehicle 1100 has located in that sequence of images (e.g., via computer vision and/or other machine learning object classification techniques). The deep-learning infrastructure may run its own neural network to identify the objects and compare them with the objects identified by the vehicle 1100 and, if the results do not match and the infrastructure concludes that the AI in the vehicle 1100 is malfunctioning, the server(s) 1178 may transmit a signal to the vehicle 1100 instructing a fail-safe computer of the vehicle 1100 to assume control, notify the passengers, and complete a safe parking maneuver.

For inferencing, the server(s) 1178 may include the GPU(s) 1184 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

FIG. 12 is a block diagram of an example computing device(s) 1200 suitable for use in implementing some embodiments of the present disclosure. Computing device 1200 may include an interconnect system 1202 that directly or indirectly couples the following devices: memory 1204, one or more central processing units (CPUs) 1206, one or more graphics processing units (GPUs) 1208, a communication interface 1210, input/output (I/O) ports 1212, input/output components 1214, a power supply 1216, one or more presentation components 1218 (e.g., display(s)), and one or more logic units 1220. In at least one embodiment, the computing device(s) 1200 may comprise one or more virtual machines (VMs), and/or any of the components thereof may comprise virtual components (e.g., virtual hardware components). For non-limiting examples, one or more of the GPUs 1208 may comprise one or more vGPUs, one or more of the CPUs 1206 may comprise one or more vCPUs, and/or one or more of the logic units 1220 may comprise one or more virtual logic units. As such, a computing device(s) 1200 may include discrete components (e.g., a full GPU dedicated to the computing device 1200), virtual components (e.g., a portion of a GPU dedicated to the computing device 1200), or a combination thereof.

Although the various blocks of FIG. 12 are shown as connected via the interconnect system 1202 with lines, this is not intended to be limiting and is for clarity only. For example, in some embodiments, a presentation component 1218, such as a display device, may be considered an I/O component 1214 (e.g., if the display is a touch screen). As another example, the CPUs 1206 and/or GPUs 1208 may include memory (e.g., the memory 1204 may be representative of a storage device in addition to the memory of the GPUs 1208, the CPUs 1206, and/or other components). In other words, the computing device of FIG. 12 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 12.

The interconnect system 1202 may represent one or more links or busses, such as an address bus, a data bus, a control bus, or a combination thereof. The interconnect system 1202 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1206 may be directly connected to the memory 1204. Further, the CPU 1206 may be directly connected to the GPU 1208. Where there is direct, or point-to-point connection between components, the interconnect system 1202 may include a PCIe link to carry out the connection. In these examples, a PCI bus need not be included in the computing device 1200.

The memory 1204 may include any of a variety of computer-readable media. The computer-readable media may be any available media that may be accessed by the computing device 1200. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1204 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1200. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1206 may be configured to execute at least some of the computer-readable instructions to control one or more components of the computing device 1200 to perform one or more of the methods and/or processes described herein. The CPU(s) 1206 may each include one or more cores (e.g., one, two, four, eight, twenty-eight, seventy-two, etc.) that are capable of handling a multitude of software threads simultaneously. The CPU(s) 1206 may include any type of processor, and may include different types of processors depending on the type of computing device 1200 implemented (e.g., processors with fewer cores for mobile devices and processors with more cores for servers). For example, depending on the type of computing device 1200, the processor may be an Advanced RISC Machines(ARM) processor implemented using Reduced Instruction Set Computing (RISC) or an x86 processor implemented using Complex Instruction Set Computing (CISC). The computing device 1200 may include one or more CPUs 1206 in addition to one or more microprocessors or supplementary co-processors, such as math co-processors.

In addition to or alternatively from the CPU(s) 1206, the GPU(s) 1208 may be configured to execute at least some of the computer-readable instructions to control one or more components of the computing device 1200 to perform one or more of the methods and/or processes described herein. One or more of the GPU(s) 1208 may be an integrated GPU (e.g., with one or more of the CPU(s) 1206 and/or one or more of the GPU(s) 1208 may be a discrete GPU. In embodiments, one or more of the GPU(s) 1208 may be a coprocessor of one or more of the CPU(s) 1206. The GPU(s) 1208 may be used by the computing device 1200 to render graphics (e.g., 3D graphics) or perform general purpose computations. For example, the GPU(s) 1208 may be used for General-Purpose computing on GPUs (GPGPU). The GPU(s) 1208 may include hundreds or thousands of cores that are capable of handling hundreds or thousands of software threads simultaneously. The GPU(s) 1208 may generate pixel data for output images in response to rendering commands (e.g., rendering commands from the CPU(s) 1206 received via a host interface). The GPU(s) 1208 may include graphics memory, such as display memory, for storing pixel data or any other suitable data, such as GPGPU data. The display memory may be included as part of the memory 1204. The GPU(s) 1208 may include two or more GPUs operating in parallel (e.g., via a link). The link may directly connect the GPUs (e.g., using NVLINK) or may connect the GPUs through a switch (e.g., using NVSwitch). When combined together, each GPU 1208 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1206 and/or the GPU(s) 1208, the logic unit(s) 1220 may be configured to execute at least some of the computer-readable instructions to control one or more components of the computing device 1200 to perform one or more of the methods and/or processes described herein. In embodiments, the CPU(s) 1206, the GPU(s) 1208, and/or the logic unit(s) 1220 may discretely or jointly perform any combination of the methods, processes and/or portions thereof. One or more of the logic units 1220 may be part of and/or integrated in one or more of the CPU(s) 1206 and/or the GPU(s) 1208 and/or one or more of the logic units 1220 may be discrete components or otherwise external to the CPU(s) 1206 and/or the GPU(s) 1208. In embodiments, one or more of the logic units 1220 may be a coprocessor of one or more of the CPU(s) 1206 and/or one or more of the GPU(s) 1208.

Examples of the logic unit(s) 1220 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1210 may include one or more receivers, transmitters, and/or transceivers that enable the computing device 1200 to communicate with other computing devices via an electronic communication network, included wired and/or wireless communications. The communication interface 1210 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1220 and/or communication interface 1210 may include one or more data processing units (DPUs) to transmit data received over a network and/or through interconnect system 1202 directly to (e.g., a memory of) one or more GPU(s) 1208.

The I/O ports 1212 may enable the computing device 1200 to be logically coupled to other devices including the I/O components 1214, the presentation component(s) 1218, and/or other components, some of which may be built in to (e.g., integrated in) the computing device 1200. Illustrative I/O components 1214 include a microphone, mouse, keyboard, joystick, game pad, game controller, satellite dish, scanner, printer, wireless device, etc. The I/O components 1214 may provide a natural user interface(NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be include depth cameras, such as stereoscopic camera systems, infrared camera systems, RGB camera systems, touchscreen technology, and combinations of these, for gesture detection and recognition. Additionally, the computing device 1200 may include accelerometers or gyroscopes (e.g., as part of an inertia measurement unit (IMU)) that enable detection of motion. In some examples, the output of the accelerometers or gyroscopes may be used by the computing device 1200 to render immersive augmented reality or virtual reality.

The power supply 1216 may include a hard-wired power supply, a battery power supply, or a combination thereof. The power supply 1216 may provide power to the computing device 1200 to enable the components of the computing device 1200 to operate.

The presentation component(s) 1218 may include a display (e.g., a monitor, a touch screen, a television screen, a heads-up-display(HUD), other display types, or a combination thereof), speakers, and/or other presentation components. The presentation component(s) 1218 may receive data from other components (e.g., the GPU(s) 1208, the CPU(s) 1206, DPUs, etc.), and output the data (e.g., as an image, video, sound, etc.).

Example Data Center

Figure 13:
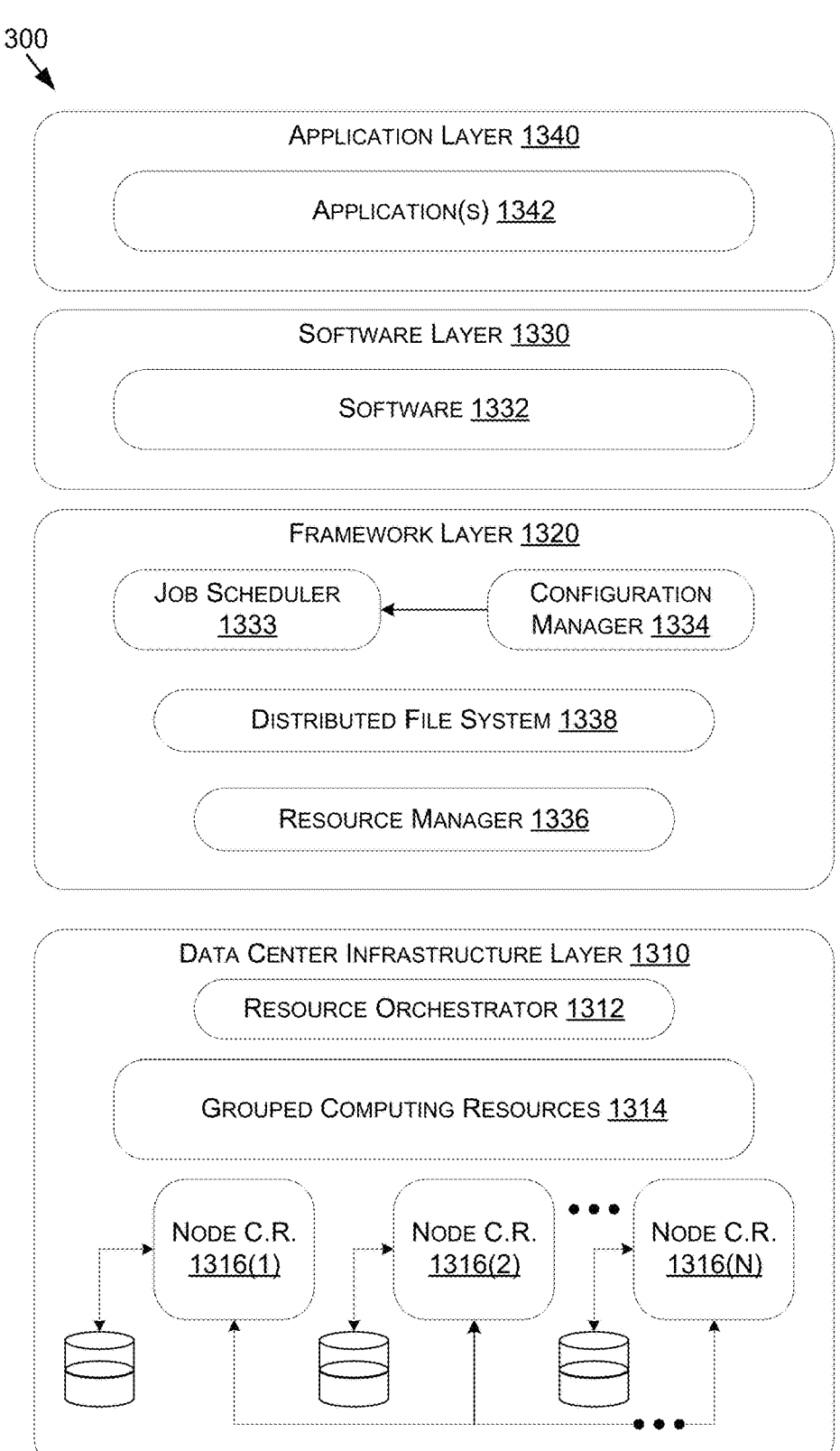
FIG. 13 is a block diagram of an example data center suitable for use in implementing some embodiments of the present disclosure.

FIG. 13 illustrates an example data center 1300 that may be used in at least one embodiments of the present disclosure. The data center 1300 may include a data center infrastructure layer 1310, a framework layer 1320, a software layer 1330, and/or an application layer 1340.

As shown in FIG. 13, the data center infrastructure layer 1310 may include a resource orchestrator 1312, grouped computing resources 1314, and node computing resources ("node C.R.s") 1316(1)-1316(N), where "N" represents any whole, positive integer. In at least one embodiment, node C.R.s 1316(1)-1316(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output(NW I/O) devices, network switches, virtual machines (VMs), power modules, and/or cooling modules, etc. In some embodiments, one or more node C.R.s from among node C.R.s 1316(1)-1316(N) may correspond to a server having one or more of the above-mentioned computing resources. In addition, in some embodiments, the node C.R.s 1316(1)-13161(N) may include one or more virtual components, such as vGPUs, vCPUs, and/or the like, and/or one or more of the node C.R.s 1316(1)-1316(N) may correspond to a virtual machine (VM).

In at least one embodiment, grouped computing resources 1314 may include separate groupings of node C.R.s 1316 housed within one or more racks (not shown), or many racks housed in data centers at various geographical locations (also not shown). Separate groupings of node C.R.s 1316 within grouped computing resources 1314 may include grouped compute, network, memory or storage resources that may be configured or allocated to support one or more workloads. In at least one embodiment, several node C.R.s 1316 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1312 may configure or otherwise control one or more node C.R.s 1316(1)-1316(N) and/or grouped computing resources 1314. In at least one embodiment, resource orchestrator 1312 may include a software design infrastructure (SDI) management entity for the data center 1300. The resource orchestrator 1312 may include hardware, software, or some combination thereof.

In at least one embodiment, as shown in FIG. 13, framework layer 1320 may include a job scheduler 1333, a configuration manager 1334, a resource manager 1336, and/or a distributed file system 1338. The framework layer 1320 may include a framework to support software 1332 of software layer 1330 and/or one or more application(s) 1342 of application layer 1340. The software 1332 or application(s) 1342 may respectively include web-based service software or applications, such as those provided by Amazon Web Services, Google Cloud and Microsoft Azure. The framework layer 1320 may be, but is not limited to, a type of free and open-source software web application framework such as Apache Spark™ (hereinafter "Spark") that may utilize distributed file system 1338 for large-scale data processing (e.g., "big data"). In at least one embodiment, job scheduler 1333 may include a Spark driver to facilitate scheduling of workloads supported by various layers of data center 1300. The configuration manager 1334 may be capable of configuring different layers such as software layer 1330 and framework layer 1320 including Spark and distributed file system 1338 for supporting large-scale data processing. The resource manager 1336 may be capable of managing clustered or grouped computing resources mapped to or allocated for support of distributed file system 1338 and job scheduler 1333. In at least one embodiment, clustered or grouped computing resources may include grouped computing resource 1314 at data center infrastructure layer 1310. The resource manager 1336 may coordinate with resource orchestrator 1312 to manage these mapped or allocated computing resources.

In at least one embodiment, software 1332 included in software layer 1330 may include software used by at least portions of node C.R.s 1316(1)-1316(N), grouped computing resources 1314, and/or distributed file system 1338 of framework layer 1320. One or more types of software may include, but are not limited to, Internet web page search software, e-mail virus scan software, database software, and streaming video content software.

In at least one embodiment, application(s) 1342 included in application layer 1340 may include one or more types of applications used by at least portions of node C.R.s 1316 (1)-1316(N), grouped computing resources 1314, and/or distributed file system 1338 of framework layer 1320. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1334, resource manager 1336, and resource orchestrator 1312 may implement any number and type of self-modifying actions based on any amount and type of data acquired in any technically feasible fashion. Self-modifying actions may relieve a data center operator of data center 1300 from making possibly bad configuration decisions and possibly avoiding underutilized and/or poor performing portions of a data center.

The data center 1300 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1300. In at least one embodiment, trained or deployed machine learning models corresponding to one or more neural networks may be used to infer or predict information using resources described above with respect to the data center 1300 by using weight parameters calculated through one or more training techniques, such as but not limited to those described herein.

In at least one embodiment, the data center 1300 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage(NAS), other backend devices, and/or other device types. The client devices, servers, and/or other device types (e.g., each device) may be implemented on one or more instances of the computing device(s) 1200 of FIG. 12—e.g., each device may include similar components, features, and/or functionality of the computing device(s) 1200. In addition, where backend devices (e.g., servers, NAS, etc.) are implemented, the backend devices may be included as part of a data center 1300, an example of which is described in more detail herein with respect to FIG. 13.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces(APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1200 described herein with respect to FIG. 12. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

determining, based at least on image data representative of an image, a two-dimensional (2D) bounding shape associated with a traffic signal depicted in the image;

determining, based at least on the 2D bounding shape, a three-dimensional (3D) bounding shape associated with the traffic signal;

determining, based at least on one or more points from a point cloud being located within the 3D bounding shape, a third plane that is associated with the traffic signal;

determining a first geometry that includes at least a portion of the third plane;

determining a second geometry associated with the traffic signal based on at least one of a number of one or more indicators associated with the traffic signal or an orientation of the one or more indicators; and determining a 3D location associated with the traffic signal by at least adjusting the first geometry based at least on the second geometry associated with the traffic signal.

2. The method of claim 1, wherein the determining the third plane associated with the traffic signal comprises:

determining, based at least on one or more locations associated with the one or more points, a center of the one or more points; and determining that the third plane is located at the center of the one or more points, the center of the one or more points being located within the 3D bounding shape.

3. The method of claim 1, wherein the determining the first geometry is based at least on projecting one or more first vertices associated with the 2D bounding shape to one or more second vertices associated with the third plane.

4. The method of claim 1, further comprising:

determining a direction of travel associated with a machine; and determining, based at least on the direction of travel, an orientation associated with the traffic signal.

5. The method of claim 4, wherein the determining the orientation associated with the traffic signal comprises:

determining that the direction of travel includes a first direction; and determining, based at least on the first direction, the orientation associated with the traffic signal as including a second direction that is opposite to the first direction.

6. The method of claim 1, further comprising:

determining the at least one of the number of the one or more indicators associated with the traffic signal or the orientation of the one or more indicators associated with the traffic signal.

7. The method of claim 1, wherein the determining the 3D bounding shape associated with the traffic signal comprises determining, based at least on the 2D bounding shape, a frustum associated with the traffic signal, the frustum including the 3D bounding shape.

8. The method of claim 1, wherein the determining the 3D bounding shape associated with the traffic signal comprises:

determining a second plane based at least on the 2D bounding shape and a first projection distance;

determining a third plane based at least on the 2D bounding shape and a second projection distance; and determining the 3D bounding shape based at least on the second plane and the third plane.

9. A system comprising:

one or more processors configured to:

determine a two-dimensional (2D) bounding shape associated with an object depicted in an image;

determine, based at least on the 2D bounding shape, a three-dimensional (3D) bounding shape associated with the object within an environment;

determine, based at least on one or more points from a point cloud that are located within the 3D bounding shape, a first geometry that includes at least a portion of a plane that is located within the 3D bounding shape;

determine a second geometry associated with the object based on at least a number of one or more indicators associated with the object or an orientation of the one or more indicators; and determine a 3D location associated with the object by at least adjusting the first geometry based at least on the second geometry associated with the object.

10. The system of claim 9, wherein the determination of the first geometry comprises:

determining, based at least on one or more locations associated with the one or more points, a center of the one or more points;

determining, based at least on the center of the one or more points, the plane associated with the object that is located within the 3D bounding shape; and determining the first geometry as including the at least the portion of the plane.

11. The system of claim 9, wherein the one or more processors are further configured to:

project one or more first vertices associated with the 2D bounding shape to one or more second vertices associated with the plane, wherein the first geometry is further determined based at least on the one or more second vertices.

12. The system of claim 9, wherein the one or more processors are further configured to:

determine a direction of travel associated with a machine; and determine, based at least on the direction of travel, an orientation associated with the object.

13. The system of claim 9, wherein the one or more processors are further configured to:

determine the at least one of the number of the one or more indicators associated with the object or the orientation of the one or more indicators associated with the object.

14. The system of claim 9, wherein the determination of the 3D bounding shape associated with the object comprises determining, based at least on the 2D bounding shape, a frustum associated with the object, the frustum including the 3D bounding shape.

15. The system of claim 9, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system implementing one or more large language models (LLMs);

a system for performing conversational AI operations;

a system for generating synthetic data;

a system incorporating one or more virtual machines (VMs);

a system implemented at least partially in a data center; or a system implemented at least partially using cloud computing resources.

16. One or more processors comprising processing circuitry to:

determine, based at least on image data representative of an image, a bounding shape associated with a traffic signal depicted in the image;

determine, based at least on the bounding shape, one or more points from a point cloud that correspond to the traffic signal;

determine, based at least on the one or more points, a plane associated with the traffic signal;

determine a first geometry associated with at least a portion of the plane;

determine a second geometry associated with the traffic signal based on at least one of an orientation of one or more indicators of the traffic signal or a number of the one or more indicators; and determine a three-dimensional (3D) location associated with the traffic signal by adjusting the first geometry associated with the at least the portion of the plane based at least on the second geometry associated with the traffic signal.

17. The one or more processors of claim 16, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system implementing one or more large language models (LLMs);

a system for performing conversational AI operations;

a system for generating synthetic data;

a system incorporating one or more virtual machines (VMs);

a system implemented at least partially in a data center; or a system implemented at least partially using cloud computing resources.

18. The one or more processors of claim 16, wherein the processing circuitry is further to:

determine a 3D bounding shape based at least on the bounding shape, wherein the determining the one or more points that correspond to the traffic signal is based at least on the 3D bounding shape.

19. The one or more processors of claim 18, wherein the plane is determined as being located within the 3D bounding shape.

20. The one or more processors of claim 18, wherein the first geometry associated with the at least the portion of the plane is determined based at least on projecting one or more first vertices associated with the bounding shape to determine one or more second vertices associated with the plane.

* * * * *